(12) United States Patent
Nguyen

(10) Patent No.: US 9,902,574 B1
(45) Date of Patent: Feb. 27, 2018

(54) CLAMPING DEVICE FOR LIFTING AND TRANSFER OBJECTS

(71) Applicant: Hoa Nhon Nguyen, Bankstown (AU)

(72) Inventor: Hoa Nhon Nguyen, Bankstown (AU)

( * ) Notice: Subject to any disclaimer, the term of this patent is extended or adjusted under 35 U.S.C. 154(b) by 0 days.

(21) Appl. No.: 15/438,735

(22) Filed: Feb. 21, 2017

(51) Int. Cl.
| | |
|---|---|
| B66C 1/48 | (2006.01) |
| B65G 63/00 | (2006.01) |
| E04H 6/24 | (2006.01) |
| B65G 1/04 | (2006.01) |
| A47F 7/28 | (2006.01) |
| B65G 1/06 | (2006.01) |

(52) U.S. Cl.
CPC ............. *B65G 63/004* (2013.01); *A47F 7/28* (2013.01); *B65G 1/04* (2013.01); *B65G 1/0492* (2013.01); *B65G 1/06* (2013.01); *B66C 1/48* (2013.01); *E04H 6/245* (2013.01)

(58) Field of Classification Search
CPC .... B66C 1/48; B65G 1/04; B65G 1/06; B66G 63/004; E04H 6/245
USPC ............ 294/102.1, 103.1, 16, 63.1, 96, 101, 294/110.2, 114
See application file for complete search history.

(56) References Cited

U.S. PATENT DOCUMENTS

| | | | | |
|---|---|---|---|---|
| 1,272,359 A * | 7/1918 | Bell | ........................... | B66C 1/48 294/103.1 |
| 3,292,964 A * | 12/1966 | Albert | ...................... | B66C 1/48 294/102.1 |
| 3,524,670 A * | 8/1970 | Ilich | ......................... | B65G 7/12 294/104 |
| 4,273,373 A * | 6/1981 | van de Wetering | ...... | B66C 1/48 294/101 |
| 4,831,693 A * | 5/1989 | Veith | ....................... | B25B 5/006 24/136 A |
| 5,896,595 A * | 4/1999 | Spencer | ................. | A45D 19/10 4/519 |
| 7,156,436 B2 * | 1/2007 | Nguyen | .................. | B66C 1/442 294/102.1 |
| 8,342,585 B1 * | 1/2013 | Cooper | ................... | B66F 9/187 294/101 |
| 2002/0149218 A1 * | 10/2002 | Gartner | ................... | A47F 7/163 294/102.1 |
| 2004/0051325 A1 * | 3/2004 | Gressbach | ................ | B66C 1/48 294/82.13 |
| 2006/0202496 A1 * | 9/2006 | Davis | ..................... | B66C 1/442 294/102.1 |

FOREIGN PATENT DOCUMENTS

DE           19923788      * 12/2000             B66C 1/48

\* cited by examiner

*Primary Examiner* — Paul T Chin
(74) *Attorney, Agent, or Firm* — Tue Nguyen

(57) ABSTRACT

A clamping device for lifting and transferring objects can employ slanting interfaces to convert a pulling action on the clamping device to a clamping action on the object. A pulling element in the form of a triangle can be disposed between a jaw and a jaw support of the clamping device. When the pulling element is pulled up, the base of the triangle shape pulling element can exert a force on the jaw against the jaw support, for securing a gripping action on the object.

20 Claims, 27 Drawing Sheets

Forming a clamping device, wherein the clamping device comprises a jaw and a jaw support, wherein the jaw and the jaw support is coupled with a slanting angle, wherein the slanting angle is configured so that when the jaw moves down, the jaw also moves toward an object
300

*FIG. 3A*

Forming a clamping device, wherein the clamping device comprises a clamp bar, a first jaw fixedly coupled to the clamp bar, and a jaw support assembly movably fixedly coupled to the clamp bar, wherein the jaw support assembly comprises a second jaw and a jaw support, wherein the second jaw and the jaw support is coupled with a slanting angle, wherein the slanting angle is configured so that when the second jaw moves down, the second jaw also moves toward an object supported between the first and second jaw for keeping the object in place
320

*FIG. 3B*

Placing an object between a first jaw and a second jaw of a clamping device, wherein the second jaw is coupled to a jaw support with a slanting angle, wherein the slanting angle is configured so that when the object moves down, the object makes the second jaw moving toward the object for keeping the object in place
340

Lifting the clamping device to move the object
350

*FIG. 3C*

Forming a clamping device, wherein the clamping device comprises a first jaw fixedly coupled to a clamp bar, and a second jaw assembly movably and fixedly coupled to the clamp bar, wherein the second jaw assembly comprises a second jaw and a jaw support, together with a pulling element disposed between the second jaw and the jaw support, wherein there is at least a slanting interface coupling between the pulling element and the second jaw or between the pulling element and the jaw support, wherein the slanting interface is configured so that when the pulling element moves up, the second jaw moves toward an object for keeping the object in place
500

*FIG. 5A*

Placing an object between a first jaw and a second jaw of a clamping device, wherein the second jaw is part of a jaw assembly, wherein the jaw assembly further comprises a jaw support and a pulling element disposed between the second jaw and the jaw support, wherein there is at least a slanting interface coupling between the pulling element and the second jaw or between the pulling element and the jaw support
520

↓

Optionally locking the jaw assembly so that the object is disposed between the first jaw and the second jaw
530

↓

Lifting the pulling element which moves the second jaw toward the object, since the slanting interface is configured so that when the pulling element moves up, the second jaw moves toward the object
540

*FIG. 5B*

Forming a clamping device, wherein the clamping device comprises a first jaw fixedly coupled to a clamp bar, and a second jaw assembly movably and fixedly coupled to the clamp bar, wherein the second jaw assembly comprises at least two components coupled through a slanting surface interface, wherein the slanting surface is configured so that when one component moves down, it also moves toward an object disposed between the first jaw and the second jaw assembly, wherein the slanting surface comprises a rolling friction
700

*FIG. 7A*

Placing an object between a first jaw and a second jaw of a clamping device, wherein the second jaw is part of a jaw assembly, wherein the jaw assembly further comprises a jaw support and a hanging element disposed between the second jaw and the jaw support, wherein there is at least a slanting surface interface coupling the hanging element and the second jaw or coupling the hanging element and the jaw support, wherein the slanting surface comprises a rolling friction
720

Optionally locking the jaw assembly so that the object is disposed between a fixed first jaw and a fixed jaw support
730

Lifting the hanging element which moves the second jaw toward the object, since the slanting surface interface comprises a rolling friction, the second jaw moves toward the object when the hanging element moves up
740

*FIG. 7B*

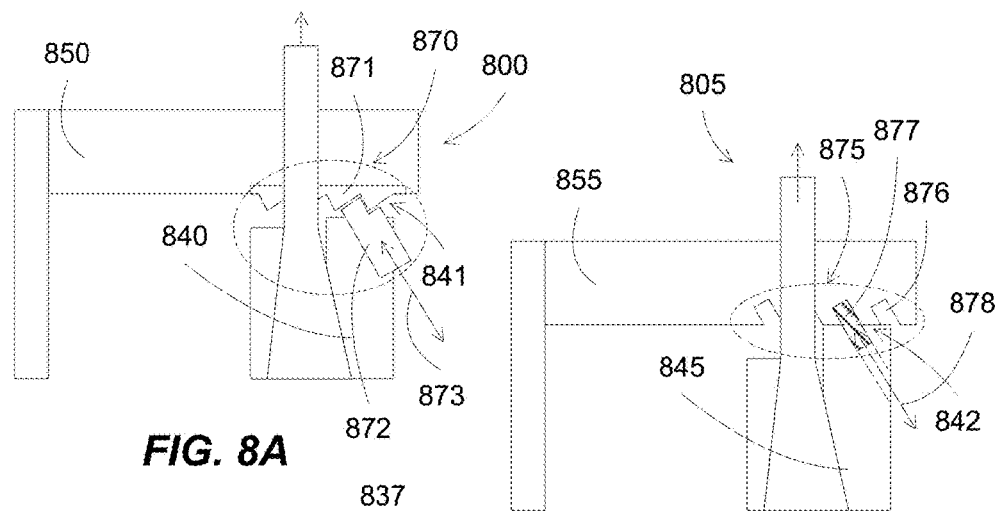
FIG. 8A
FIG. 8B
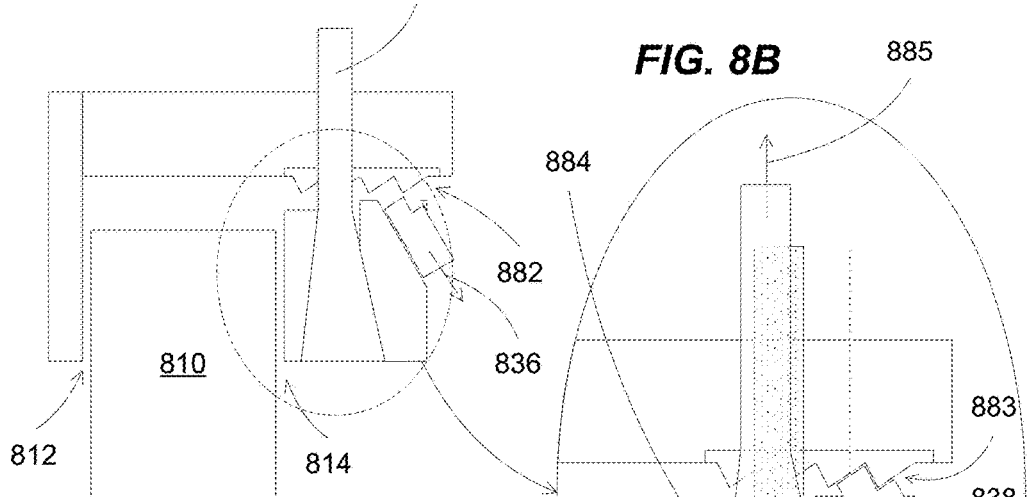
FIG. 8C
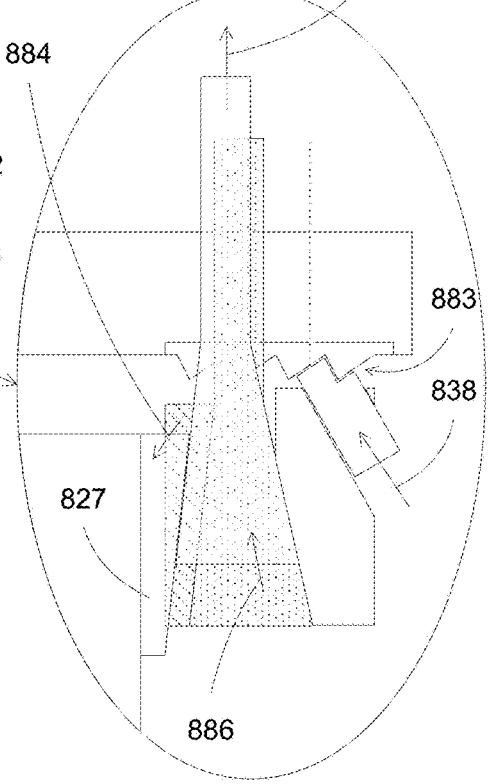

Forming a clamping device, wherein the clamping device comprises a first jaw fixedly coupled to a clamp bar, and a second jaw assembly movably and fixedly coupled to the clamp bar, wherein the second jaw assembly comprises a locking mechanism for fixedly coupling the second jaw assembly to the clamp bar, wherein the locking mechanism is configured to secure the second jaw assembly to the clamp bar continuously or at discrete locations
900

*FIG. 9A*

Placing an object between a first jaw and a second jaw of a clamping device, wherein the second jaw is part of a jaw assembly, wherein the jaw assembly further comprises a locking mechanism for securing the jaw assembly with respect to the first jaw, wherein the locking mechanism is configured to secure the jaw assembly at discrete locations
920

Unlocking the locking mechanism to place an object between the first jaw and the second jaw
930

Locking the locking mechanism at a location to achieve a minimum gap between the first and second jaws with the object
940

Lifting the clamping device to secure the object between the first and second jaws
950

Lifting the clamping device to move the object
960

*FIG. 9B*

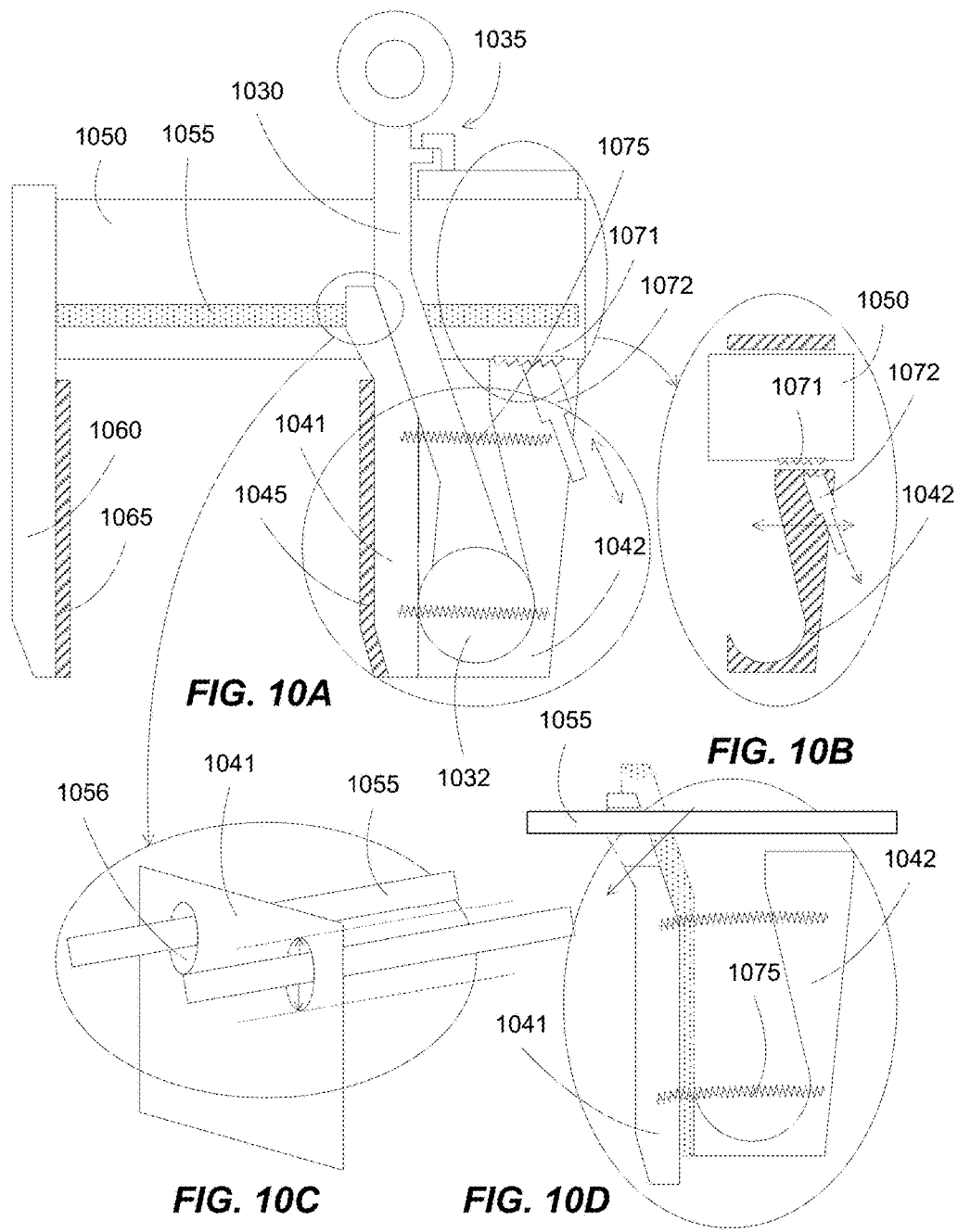

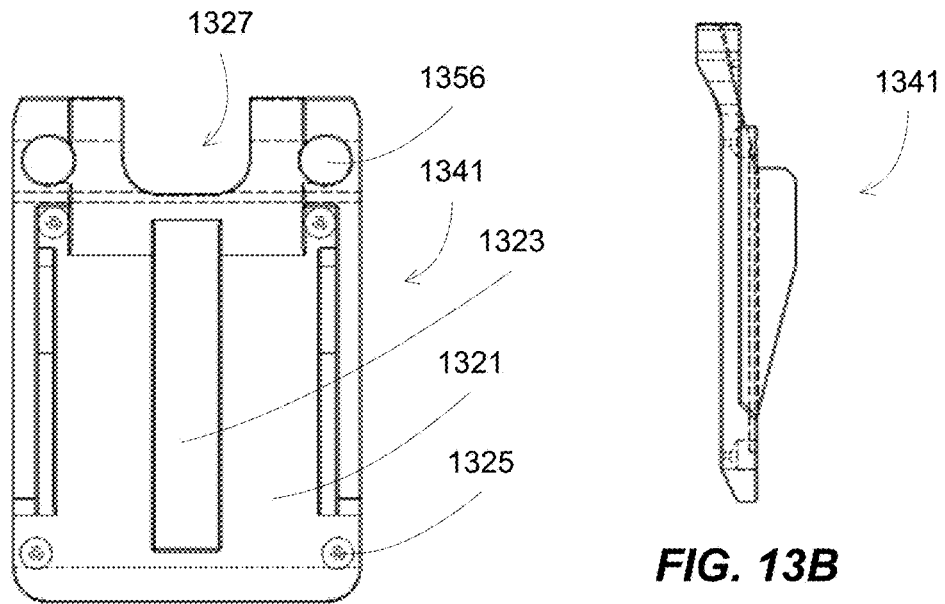
FIG. 13A
FIG. 13B
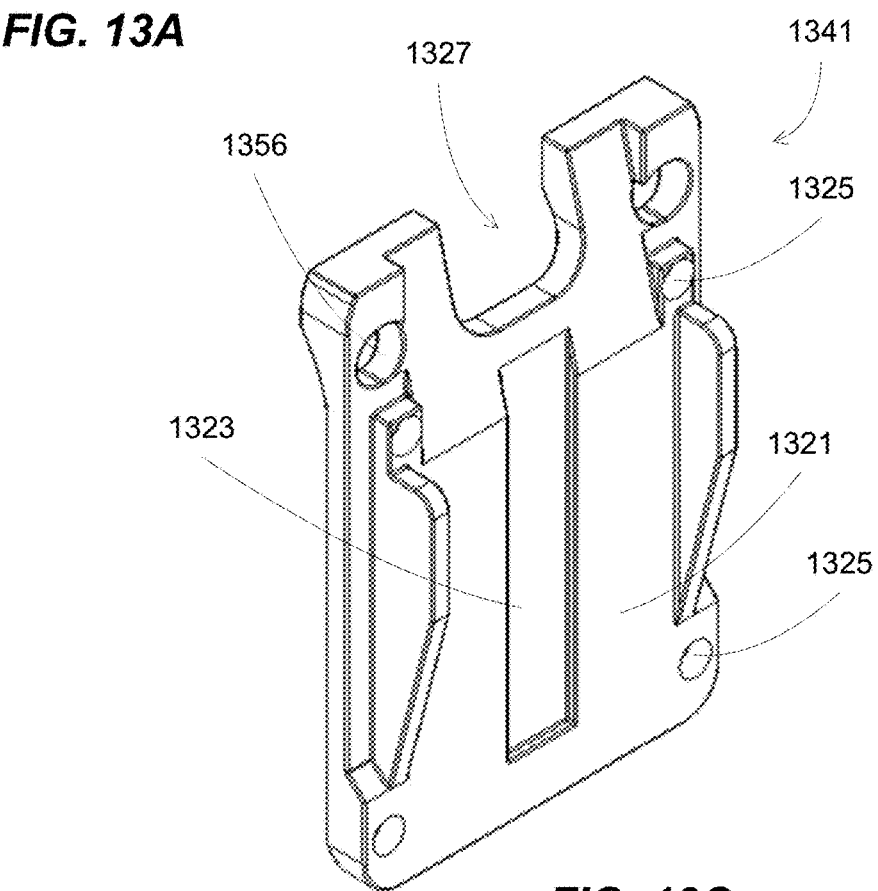
FIG. 13C

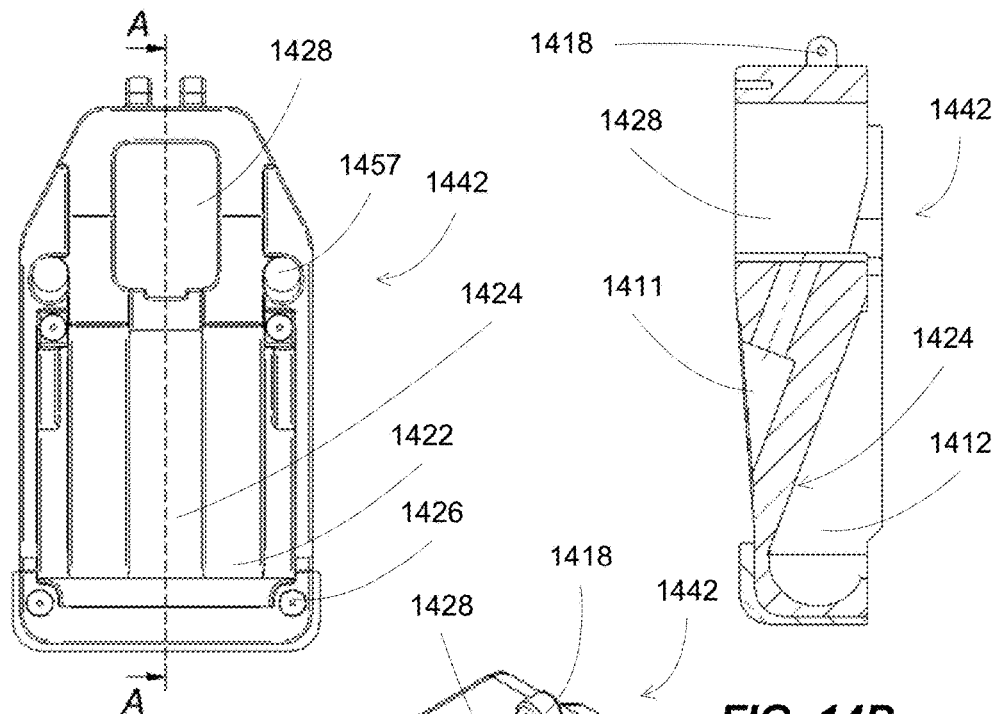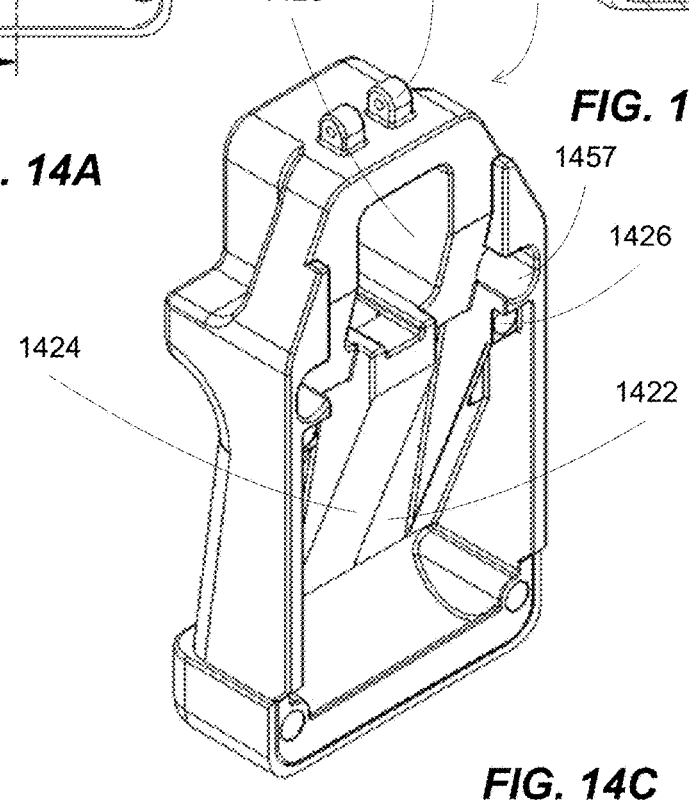
FIG. 14A
FIG. 14B
FIG. 14C

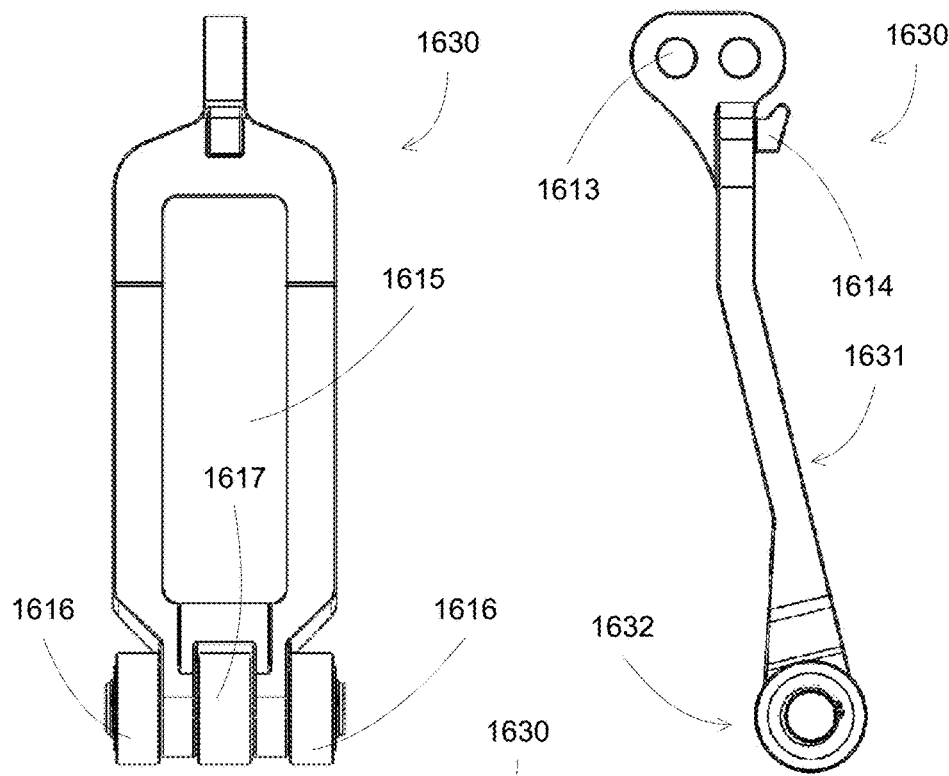
FIG. 16A
FIG. 16B
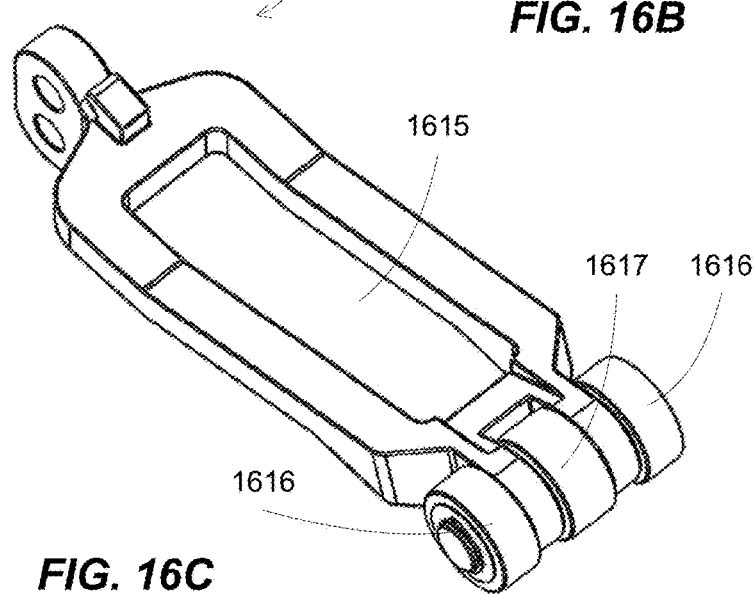
FIG. 16C

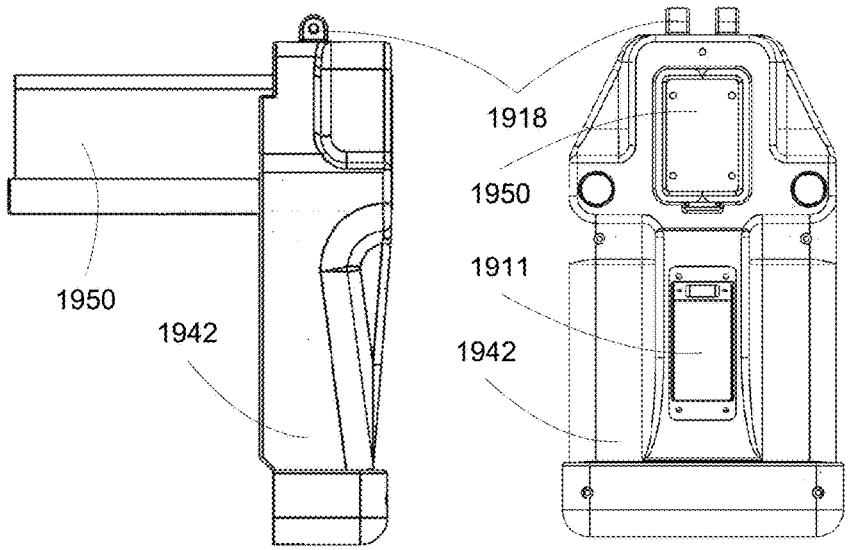
FIG. 19A  FIG. 19B
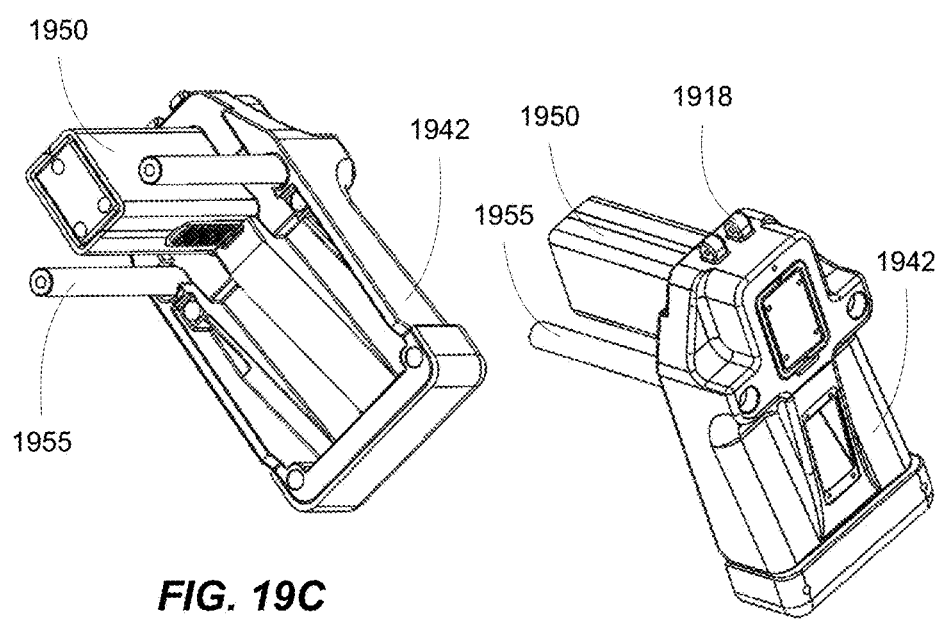
FIG. 19C
FIG. 19D

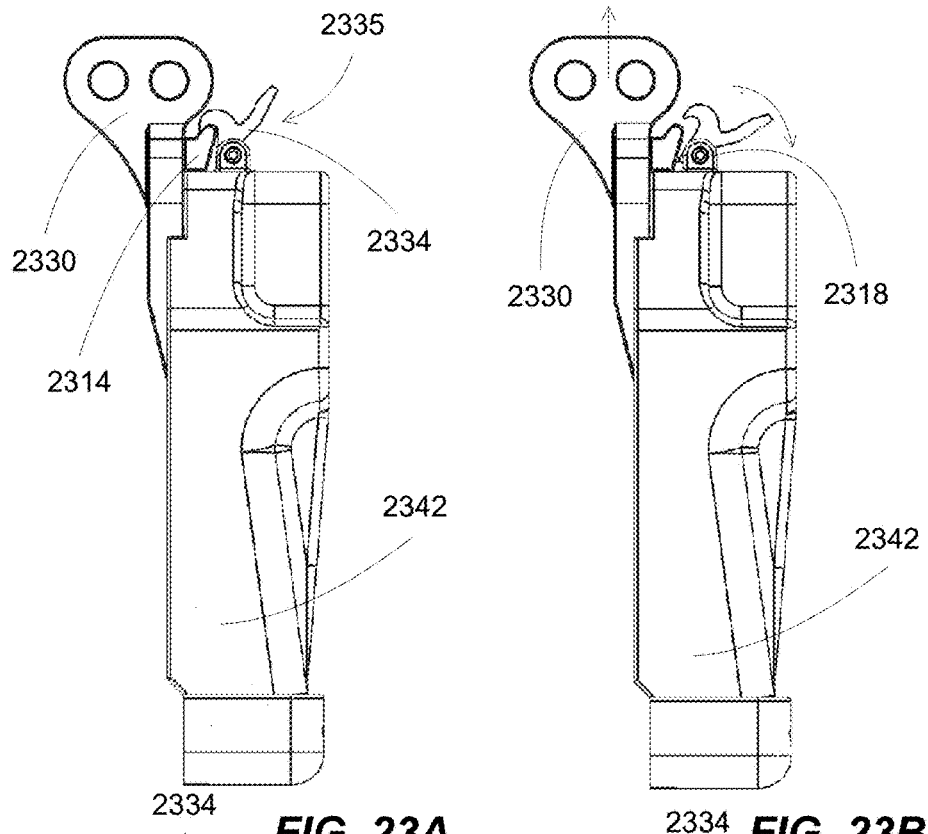
FIG. 23A  FIG. 23B
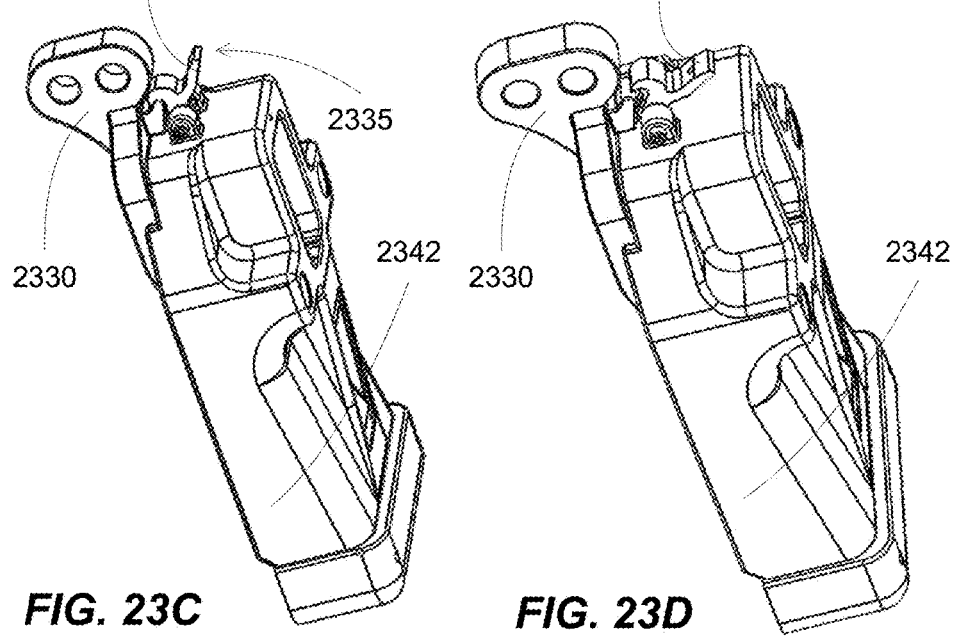
FIG. 23C  FIG. 23D

Forming a clamping device, wherein the clamping device comprises a first jaw coupled to a clamp bar, and a jaw assembly coupled to the clamp bar, wherein the jaw assembly comprises a second jaw disposed opposite the first jaw for clamping on an object,
wherein the jaw assembly comprises a jaw support,
wherein the jaw assembly comprises a hanging element disposed between the second jaw and the jaw support,
wherein at least an interface between the hanging element and the jaw support and an interface between the hanging element and the second jaw comprises a slanting surface,
wherein the slanting surface is configured so that when the clamping device is lifted up from the hanging element, the second jaw is configured to press on the object
2400

FIG. 24A

Forming a clamping device, wherein the clamping device comprises a clamp bar, a first jaw, and a jaw assembly,
wherein the jaw assembly comprises a jaw support, wherein at least one of the first jar or the jaw support is configured to movably couple to the clamp bar and to lockably coupled to the clamp bar at discrete positions through a locking mechanism,
wherein the jaw assembly comprises a second jaw disposed opposite the first jaw for clamping on an object, wherein the second jaw is coupled to the jaw support through a flexible component to allow the second jaw to move in multiple directions with respect to the jaw support,
wherein the jaw assembly comprises a hanging element disposed between the second jaw and the jaw support,
wherein at least an interface between the hanging element and the jaw support and an interface between the hanging element and the second jaw comprises a slanting surface, wherein the slanting surface interface comprises a rolling friction,
wherein the slanting surface is configured so that when the hanging element moves in a direction comprising a vertical direction, the second jaw moves away relative to the jaw support in a direction comprising a horizontal direction.
2420

FIG. 24B

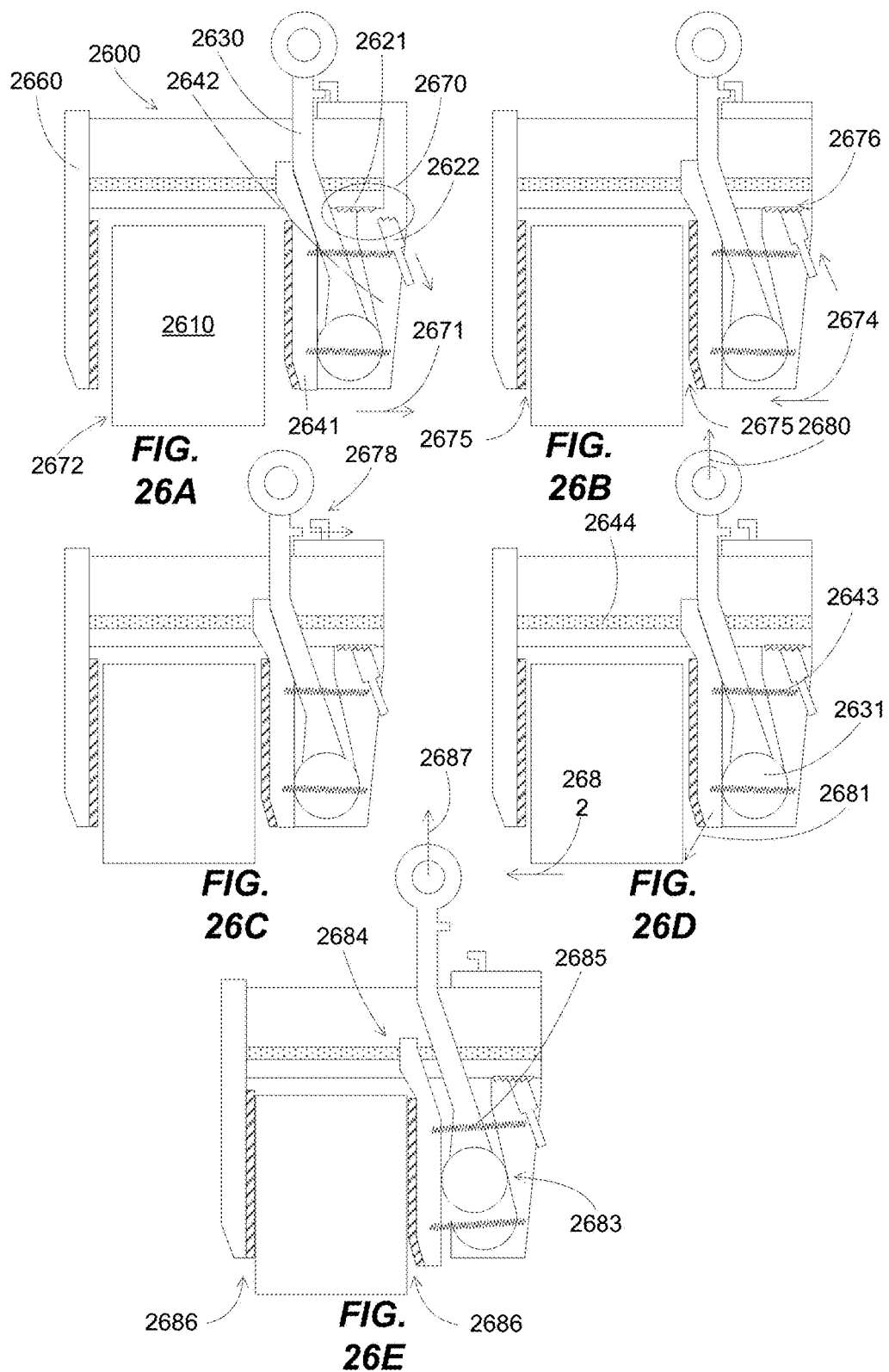

Placing an object between two jaws of a clamping device
2700

Lifting a component of the clamping device, wherein the component is configured to exert a side force through a slanting surface to one of the two jaws for clamping on the object
2710

*FIG. 27A*

Placing an object between a fixed first jaw and a movable jaw assembly of a clamping device
2730

Locking the jaw assembly at a position among multiple positions to achieve a minimum gap between the object and the first jaw and the jaw assembly
2740

Lifting a component of the clamping device, wherein the component is configured to move a second jaw of the jaw assembly toward the object through a slanting surface to narrow the gap
2750

Lifting the component, wherein the component is configured to exert a side force through the slanting surface to the second jaw for clamping on the object
2760

*FIG. 27B*

CLAMPING DEVICE FOR LIFTING AND TRANSFER OBJECTS

The present invention relates to lifting devices. More particularly, it relates to clamping devices for lifting and transferring objects such as metal or ceramic plates.

BACKGROUND

In the heavy industry, large and heavy products can be difficult to handle manually. Thus, a hoist connecting to a clamping device can be used to lift and move heavy objects. A object can be clamped to a clamping device that is coupled to a hoist. The hoist can lift the object to a certain height, and then transfer to a proper location.

The clamping devices can utilize a mechanism that converts the weight of the object into a clamping force, thus the holding force on the object exerted by the clamping devices can be proportional to the weight of the object. A loading and unloading device, such as a crane or a hoist, can be coupled to the clamping device for lifting and transferring the objects.

A basic prior art clamping device can include a rotatable clamping jaw, which can rotate to change a spacing distance to a fixed clamping jaw. Rotation of the rotatable clamping jaw can enlarge or narrow the distance between the two clamp jaws. For example, an object can be placed between the two jaws from a bottom position, and the pushed upward toward the gap between the two jaws. The upward motion of the object can cause a clockwise rotation of the rotatable clamping jaw, which can make the distance between the two jaws larger, to accommodate an object. After the object is placed between the two jaws, the weight of the object can cause the object to move downward. The downward motion of the object can cause a counterclockwise rotation of the rotatable clamping jaw, which can narrow the distance between the two jaws, or to exert a clamping force on the object.

FIG. 1A illustrates a prior art rotatable clamping device according to some embodiments. A clamping device 100 can include a clamp body 110, which can house a fixed clamp jaw 130 and a rotatable clamp jaw 120. The fixed clamp jaw and the rotatable clamp jaw can be configured to clamp an object 160. The rotatable clamp jaw can have an offset center of rotation 150, thus when the rotatable clamp jaw rotates counter clockwise, it comes closer to the fixed clamp jaw 130. That way the clamping device can support a number of sizes of objects. A spring 140 can preload the rotatable clamp jaw, e.g., to push the rotatable clamp jaw toward the fixed clamp jaw.

In operation, when the clamping device 100 is empty, e.g., when there is no object in the clamping device, the spring 140 pushes the rotatable clamp jaw counterclockwise toward the fixed clamp jaw, so there is no gap between the two jaws. An object 160 can be pushed in the clamping device, for example, upward to the space between the two jaws from a bottom position. The pushing action can open the gap between the two jaws by rotating the rotatable clamp jaw clockwise.

Gravity then hold the object in place, e.g., when the object is pulling out of the clamping device, for example, in a downward direction, the rotatable clamp jaw is rotated counterclockwise due to friction between the object and the contact surface of the rotatable clamp jaw. The rotation exerts a force on the object, preventing the object from being pulled out of the clamping device.

The rotatable clamping device can be compact and simple. But there can be focused force at the rotatable clamp jaw, e.g., at the contact area of the rotatable clamp jaw with the object. Thus the rotatable clamping device is not designed to handle heavy object, since heavy object requires a large clamping force, and the focused large clamping force might cause damage to the object.

Another prior art clamping device can include a gripping device normally fabricated from structural steel components, that are designed to securely hold and lift construction materials though a scissor movement. The gripping device can use freely rotating pin connections to create a scissor configuration with two scissor arms.

A first end of the scissor arms is configured to rotate towards each other in reaction to the opposite second end of the scissor arms being lifted vertically. The first end of the scissor arms rotate inwards and generate a compression force clamping on the object to be lifted. Essentially, the weight of the object is used to generate this clamping action.

FIG. 1B illustrates a prior art gripping device according to some embodiments.

A gripping device 105 can include two scissor arms 125 and 155, which can freely rotate about a pivot point 135. The scissor arms 125 and 155 can include upper arms 121 and 151, together with lower arms 122 and 152, respectively, connected through the freely rotating pivot 135.

The upper arms 121 and 151 can be coupled to pulling elements 141 and 142, respectively. The coupling between the upper arms and the pulling elements can include freely rotating pin connections, e.g., the pulling element 141/142 can be rotated relative to the upper arm 121/151. The pulling elements 141 and 142 can be coupled to a lift 145, such as a hoist. The coupling between the pulling elements and the lift can include freely rotating pin connections, e.g., the pulling elements 141 and 142 can be rotated relative to the lift 145.

The lower arms 122 and 152 can be coupled to holding pads 111 and 112, respectively. The coupling between the lower arms and the holding pads can include freely rotating pin connections, e.g., the holding pads 111/112 can be rotated relative to the lower arm 122/152.

In operation, an object 165 is placed between the holding pads 111 and 112. The lift 145 is pulled up, which pulls on the pulling elements 141 and 142. The pulling elements 141 and 142 can in turn pull on the upper arms 121 and 151. The scissor movement between the upper arms 121/151 and the lower arms 122/152 around the pivot point 135 can turn the pulling action on the upper arm 121/151 into a pressing action of the lower arm 122/152, which presses on the object 165 through the holding pads 111 and 112.

Disadvantages of the gripper devices can include large sizes due to the long arms. For example, if the friction coefficient between the holding pads and the object is about 0.2, then a five times the weight of the object is needed to hold the object. In other words, the ratio of the upper arms and the lower arms is also about five to obtain the holding force.

SUMMARY OF THE EMBODIMENTS

In some embodiments, the present invention discloses a clamping device for lifting and transferring objects. The clamping device can employ slanting interfaces to convert a pulling action on the clamping device to a clamping action on the object.

The clamping device can include a jaw and a jaw assembly coupled to a clamp bar. The jaw assembly can include a second jaw and a jaw support facing each other. The jaw support can have a slanting surface, such as the jaw and the jaw support can form a hollow cavity in the shape of a triangle. A pulling element in the form of a mating triangle can be disposed in the hollow cavity between the jaw and the jaw support. When the pulling element is pulled up, the base of the triangle shape pulling element can exert a force on the jaw against the jaw support, for securing a gripping action on the object.

BRIEF DESCRIPTION OF THE DRAWINGS

FIGS. 3A-3C illustrate flow charts for forming and operating a clamping device according to some embodiments.

FIGS. 5A-5B illustrate flow charts for forming and operating a three-part clamping device according to some embodiments.

FIGS. 7A-7B illustrate flow charts for forming and operating clamping devices with rolling frictions according to some embodiments.

FIGS. 8A-8C illustrate configurations for clamping devices with locking mechanisms according to some embodiments.

FIGS. 9A-9B illustrate flow charts for forming and operating clamping devices with rolling frictions according to some embodiments.

FIGS. 10A-10D illustrate a clamping device according to some embodiments.

FIGS. 13A-13C show different views of a jaw of in jaw assembly in the clamping device.

FIGS. 14A-14C show different views of a jaw support portion of a jaw assembly in the clamping device.

FIGS. 16A-16C show different views of a pulling element portion of a jaw assembly in the clamping device.

FIGS. 19A-19D show configurations for a jaw support coupling to a clamp bar in the clamping device.

FIGS. 23A-23D show configurations for a locking mechanism to secure a jaw support to a clamp bar in the clamping device.

FIGS. 24A-24B illustrate flow charts for forming a clamping device according to some embodiments.

FIGS. 26A-26E illustrate detailed operations of a clamping device according to some embodiments.

FIGS. 27A-27B illustrate flow charts for operating a clamping device according to some embodiments.

DETAILED DESCRIPTION OF THE EMBODIMENTS

Figure 1:
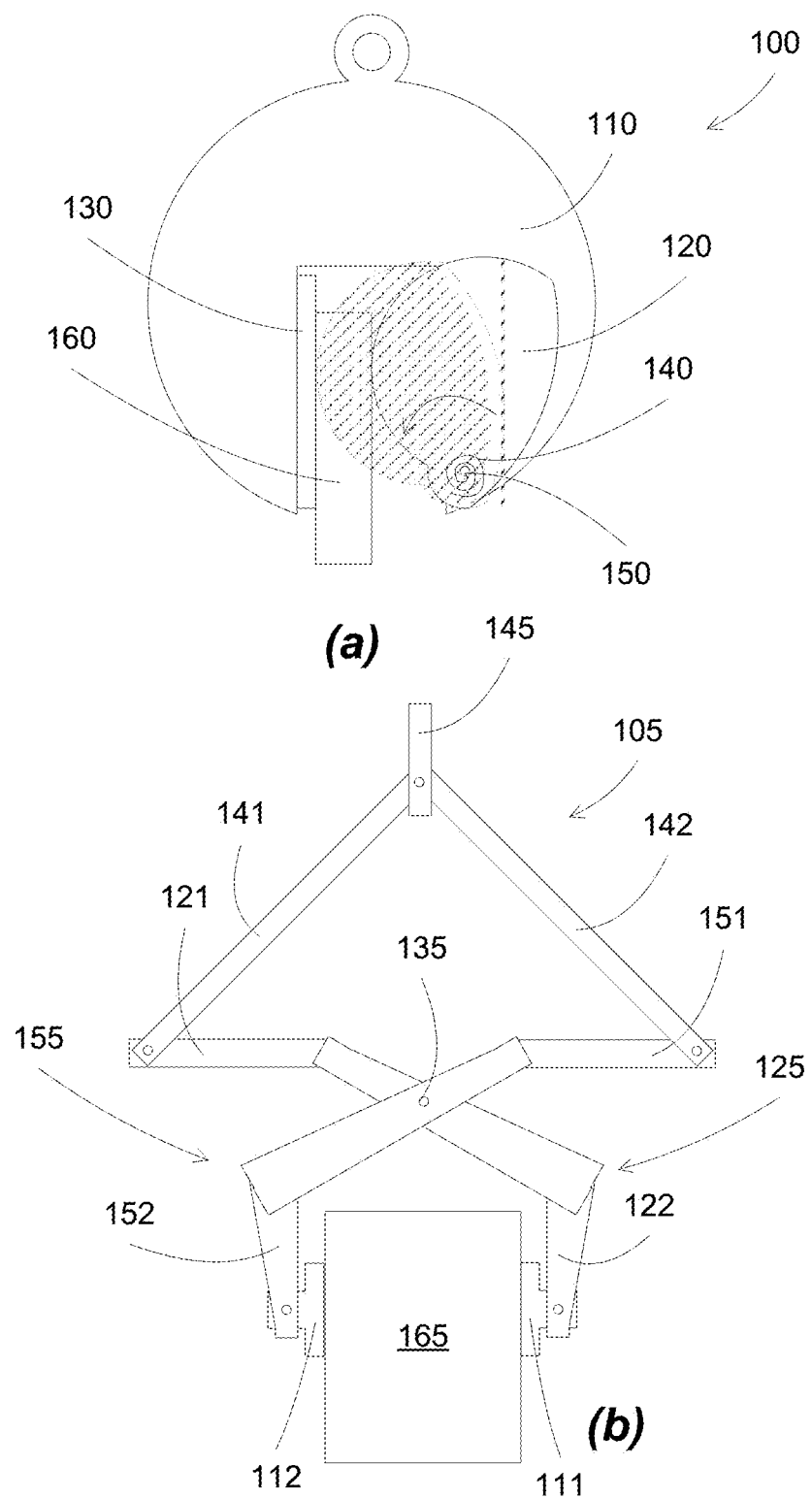
FIG. 1A illustrates a prior art rotatable clamping device according to some embodiments.
FIG. 1B illustrates a prior art gripping device according to some embodiments.

In some embodiments, the present invention discloses a clamping device for lifting and/or transferring objects, such as metal, granite, ceramic, glass, quartz, or concrete plates. The clamping device can use a slanting surface to convert the weight of the object into a compression force for clamping and holding the object. The slanting surface can provide a high ratio of force transfer. Due to the high conversion ratio, the clamping devices using slanting surface can be compact for lifting and transferring heavy objects.

In some embodiments, a clamping device can include two jaw assemblies coupled to a clamp bar. The jaw assemblies can be disposed away and facing each other. Each jaw assembly can include a jaw for clamping on an object. A jaw assembly can include other components, such as a high friction pad, e.g., a rubber pad with high surface area pattern, coupled to a surface of the jaw for holding the object. The jaw assembly can be coupled to the clamp bar through the jaw, e.g., it is the jaw that is coupled to the clamp bar, and the other components, such as the rubber pad, can be coupled to the jaw.

A jaw assembly can include a jaw support, in addition to the jaw and optionally the rubber pad. The jaw assembly can be coupled to the clamp bar through the jaw support, e.g., it is the jaw support that is coupled to the clamp bar, and the other components, such as the jaw, can be coupled to the jaw support. The other components can be coupled to the components that are coupled to the jaw support, such as the rubber pad is coupled to the jaw.

In some embodiments, there are two jaw supports coupled to the clamp bar. The clamping device thus can include a first jaw assembly having a first jaw and a first rubber pad coupled to the first jaw support, and a second jaw assembly having a second jaw and a second rubber pad coupled to the second jaw support.

In some embodiments, there are one first jaw and one jaw support coupled to the clamp bar. The clamping device thus can include a first jaw assembly having the first jaw and a first rubber pad, and a second jaw assembly having a second jaw and a second rubber pad coupled to the jaw support.

The jaw assemblies can be fixedly coupled to the clamp bar, or can be movably coupled to the clamp bar. If movably coupled to the clamp bar, the jaw assemblies can be secured, e.g., fixedly coupled to the clamp bar when secured, and movable when unsecured. The movable jaw assemblies can be used to adjust a distance between the jaws for accommodating different sizes of the object to be clamped and lifted. After the object is placed between the jaws, e.g., after the opening between the jaws is large enough to accommodate the object, the movable jaw assemblies can be secured, e.g., fixedly coupled to the clamp bar.

In some embodiments, there are two jaw assemblies movably and securely coupled to the clamp bar. For example, a first jaw assembly can include a first jaw having an opening in which the clamp bar can pass through. Thus the first jaw (and the first jaw assembly) can be movable along the clamp bar. A first locking mechanism can be include to secure the first jaw to the clamp bar, such as a latch or a spring-loaded latch. The locking mechanism can be engaged, e.g., securing the jaw (and the jaw assembly) to the clamp bar, and/or disengaged, e.g., releasing the jaw (and the jaw assembly) from the clamp bar so that the jaw (and the jaw assembly) can be freely movable along the clamp bar, with or without a key.

Alternatively, a first jaw assembly can include a first jaw coupled to a first jaw support which has an opening in which the clamp bar can pass through. Thus the first jaw support (and the first jaw assembly) can be movable along the clamp bar. A first locking mechanism can be include to secure the first jaw support to the clamp bar, such as a latch or a spring-loaded latch. The locking mechanism can be engaged, e.g., securing the jaw support (and the jaw assembly) to the clamp bar, and/or disengaged, e.g., releasing the jaw support (and the jaw assembly) from the clamp bar so that the jaw support (and the jaw assembly) can be freely movable along the clamp bar, with or without a key.

The second jaw assembly can be similarly constructed. For example, the second jaw assembly can include a second jaw having an opening in which the clamp bar can pass through and a second locking mechanism to secure the second jaw to the clamp bar. Alternatively, the second jaw assembly can include a second jaw coupled to a jaw support which has an opening in which the clamp bar can pass through and a second locking mechanism to secure the second jaw support to the clamp bar.

In some embodiments, there are one first jaw assembly movably and securely coupled to the clamp bar and one second jaw assembly fixedly coupled to the clamp bar. For example, a first jaw assembly can include a first jaw having an opening in which the clamp bar can pass through. Thus the first jaw (and the first jaw assembly) can be movable along the clamp bar. A first locking mechanism can be include to secure the first jaw to the clamp bar, such as a latch or a spring-loaded latch. The locking mechanism can be engaged, e.g., securing the jaw (and the jaw assembly) to the clamp bar, and/or disengaged, e.g., releasing the jaw (and the jaw assembly) from the clamp bar so that the jaw (and the jaw assembly) can be freely movable along the clamp bar, with or without a key.

Alternatively, a first jaw assembly can include a first jaw coupled to a first jaw support which has having an opening in which the clamp bar can pass through. Thus the first jaw support (and the first jaw assembly) can be movable along the clamp bar. A first locking mechanism can be include to secure the first jaw support to the clamp bar, such as a latch or a spring-loaded latch. The locking mechanism can be engaged, e.g., securing the jaw support (and the jaw assembly) to the clamp bar, and/or disengaged, e.g., releasing the jaw support (and the jaw assembly) from the clamp bar so that the jaw support (and the jaw assembly) can be freely movable along the clamp bar, with or without a key.

The second jaw assembly can be fixedly coupled to the clamp bar. For example, the second jaw assembly can include a second jaw fixedly coupled to the clamp bar. Alternatively, the second jaw assembly can include a second jaw coupled to a jaw support which is fixedly coupled to the clamp bar.

A jaw assembly can include a slanting interface, for example, between a jaw and a jaw support. When a hoist is pulling upward on the clamping device, the upward force can be converted to a side force due to the slanting interface. Alternatively, when an object is sliding down from the clamping device, the weight of the object can be converted to the side force due to the slanting interface. The side force can press on the jaw of the jaw assembly for clamping on the object, preventing the object from being released or slided or dropped from the clamping device.

The clamping device can have one slanting interface, e.g., a first jaw assembly having the slanting interface and a second jaw assembly without a slanting interface. Alternatively, the clamping device can have two slanting interfaces, e.g., a first jaw assembly having a first slanting interface and a second jaw assembly having a second slanting interface.

Figure 2A:
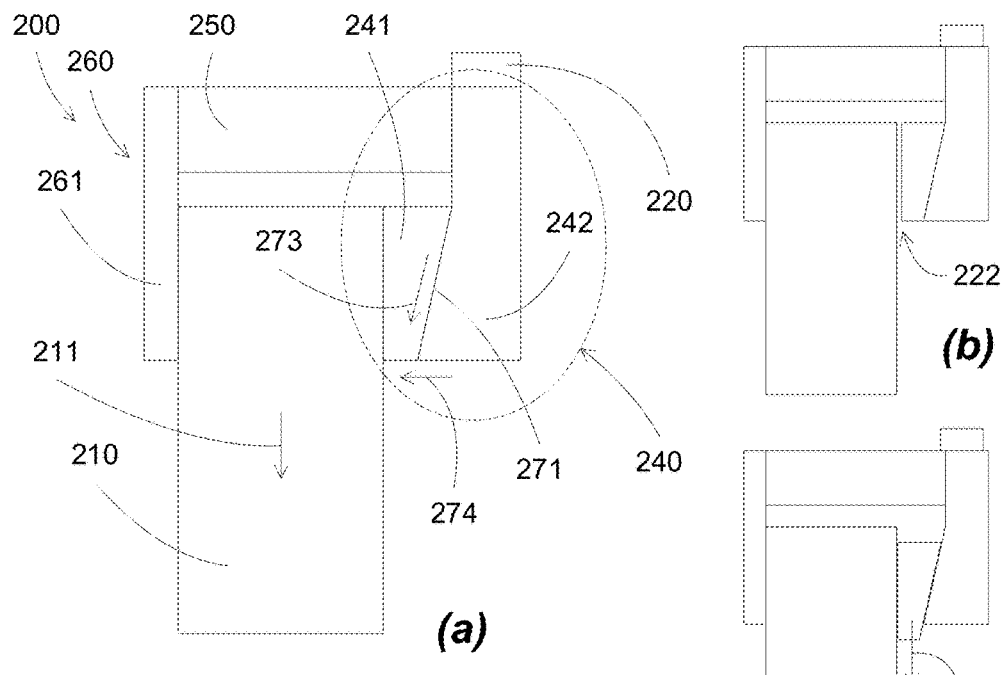
FIGS. 2A (a)-(c) and 2B illustrate clamping devices according to some embodiments.
Figure 2B:
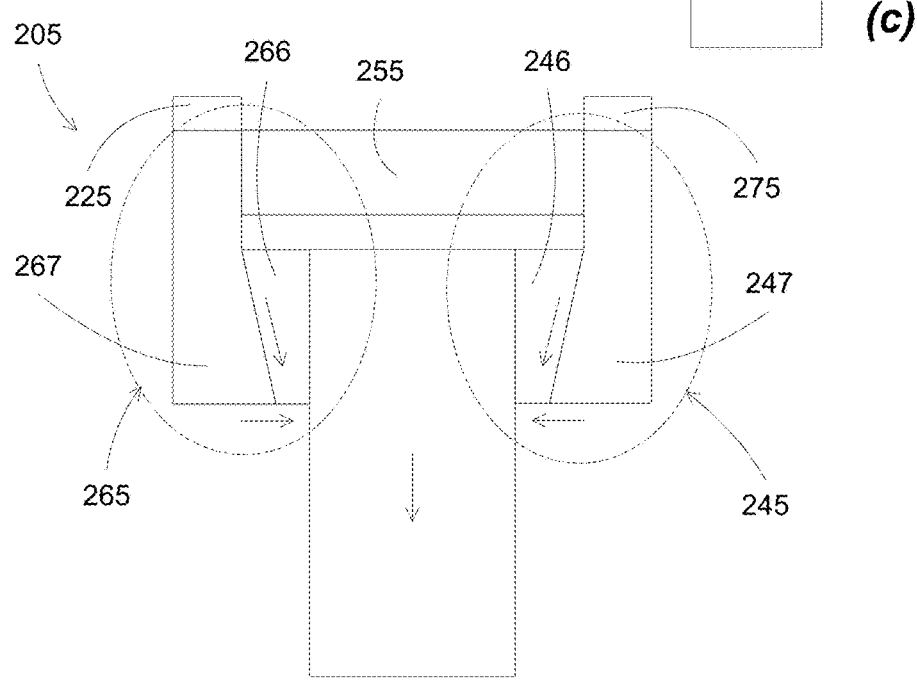

FIGS. 2A (a)-(c) and 2B illustrate clamping devices according to some embodiments. The clamping devices can have compact sizes for handle heavy objects. FIG. 2A (a)-(c) show a clamping device 200 having one slanting interface in a jaw assembly 240. FIG. 2B shows a clamping device 205 having two slanting interfaces in two jaw assemblies 245 and 265.

In FIG. 2A (a), a clamping device 200 can include two jaw assemblies 240 and 260 coupled to a clamp bar 250. The jaw assembly can include a jaw, or a jaw and a jaw support. As shown, the jaw assembly 260 includes a jaw 261. And the jaw assembly 240 includes a jaw 241 and a jaw support 242.

The jaw assembly can be fixedly coupled to the clamp bar, or can be movably and securably (or lockably) coupled to the clamp bar, using an optional locking mechanism. As shown, the jaw assembly 260 is fixedly coupled to the clamp bar 250. And the jaw assembly 240 is movably coupled to the clamp bar 250, together with a locking mechanism 220 for securing the jaw assembly 240 to the clamp bar 250.

The jaw assemblies 240 and 260 each can include a jaw for clamping on an object 210. For example, the jaw assembly 260 can include a first jaw 261. The jaw assembly 240 can include a second jaw 241, which together with the first jaw 261, pressing on the object 210 for clamping the object. The jaw assemblies can be fixedly coupled to the clamp bar. For example, the jaw assembly 260 can be fixedly coupled to the clamp bar 250 by securing the first jaw 261 with the clamp bar 250. The jaw assemblies can be movable along to the clamp bar, e.g., to accommodate different sizes of the object. Once the jaw opening between the jaws 241 and 261 is large enough to clamp on the object 210, the jaw support 240 can then be fixed to the clamp bar 250. For example, the jaw assembly 240 can be movable along the clamp bar 250 by sliding the jaw support 242 along the clamp bar 250. A locking mechanism 220 can be included to lock, e.g., to secure, the jaw assembly 240 to the clamp bar 250, for example, by latching the jaw support 242 to the clamp bar 250.

The jaw assembly 240 can include a slanting interface 271, which can include a slanting surface on the second jaw 241, mating with a slanting surface on the jaw support 242. At the slanting interface 271, e.g., at the mated slanting surfaces of the second jaw 241 and the jaw support 242, the second jaw 241 can move relative to the jaw support 242 along the slanting interface.

When the object 210 starts to move down due to gravity, the object can cause the second jaw to also start to move down due to a friction between the object and the second jaw. Alternatively, when the clamping device 200 starts to move up for lifting the object 210, the clamping device starts to cause the jaw support to move up.

The slanting interface 271 can be configured so that when the second jaw 241 starts to move down 273 (or when the jaw support 242 starts to move up), the second jaw can also start to move away 274 from the jaw support since the jaw support is secured to the clamp bar. The potential side movement of the second jaw can exert a force on the object, preventing the object from moving down, e.g., to clamp the object in place.

The slanting interface can be configured so that the second jaw 241 can be moving toward the object 210 when the second jaw 241 is moving down. Thus, if there is no obstacle blocking the movement of the second jaw, e.g., the object is not present or the object is not in contact with the second jaw, the second jaw is moving toward the object when the second jaw is moving downward.

The slanting interface can be configured so that when there is a downward force 273 acting on the second jaw 241, the downward force can be converted to a sideward force 274 toward the object. The downward force can be a force in any direction having a force component in a downward direction. The conversion of the downward force can be viewed as a decomposition or a splitting of the downward force into multiple force components, in which a force component has a sideward direction. Thus, if there is no obstacle blocking the movement of the second jaw, e.g., the object is not present or the object is not in contact with the second jaw, the second jaw is moving toward the object (in addition to the second jaw moving down) when there is a downward force acting on the second jaw. If there is an obstacle blocking the movement of the second jaw, e.g., the object is in contact with the second jaw, there is a sideward force from the second jaw pressing on the object.

The slanting interface can include a slanting surface making an acute angle with a vertical plane with a top portion of the slanting surface away from the object more than a bottom portion of the slanting surface. The slanting surface can be tilted toward the object at a bottom portion, or tilted away from the object at a top portion.

The slanting interface can have a low friction surface, e.g., lower than the friction between the object 210 and the second jaw 241. For example, the second jaw 241 can include a rubber layer facing the object, which can have high friction toward the object. The first jaw 261 can also include a rubber layer facing the object.

In some embodiments, the downward direction means the direction of the gravity. An upward direction means an opposite direction of the downward direction. A top portion can mean a portion in an upward direction, in opposite direction to a bottom portion, which can mean a portion in a downward direction.

A sideward direction means a horizontal direction, e.g., a direction perpendicular to the downward direction. Since the clamping device is configured to clamp, lift and transfer objects, the object exerts a downward force on the clamping device due to gravity, or the clamping device exerts an upward force on the object for lifting the object.

In operation, the object is first clamped between the jaws 261 and 241 of the clamping device. For example, the locking mechanism 220 can be disengaged, so that the jaw support 242 is free to move along the clamp bar 250. The jaw assembly 240 can be moving away from the jaw assembly 260 to enlarge the opening between the jaw 261 and 241. Once the opening is large enough to accommodate the object, the object can be placed between the jaws. The jaw assembly 240 can then be moving toward the object so that the object is in contact with the jaws, or so that there is a minimum gap between the object and the jaws. The jaw assembly 240 then can be secured to the clamp bar, for example, by engaging the locking mechanism 220.

There can be a gap 222 (FIG. 2A (b)) between the object and the jaws, if the locking mechanism 220 is a discrete locking mechanism, e.g., the locking mechanism can secure the jaw assembly 240 to the clamp bar 250 at discrete locations, and the engagable locations for the current object do not allow the object to be in contact. The location to engage the locking mechanism can be selected to ensure a minimum gap between the object and the jaws, meaning the distance between the object and the first and second jaw is smaller than the distance between two successive locking locations of the locking mechanism. The minimum gap can be achieved by moving the jaw assembly 240 in a direction of narrowing the gap until the jaw assembly reaches the object, e.g., until the object is in contact with the jaws 261 and 242. The jaw assembly 240 is then backed up, e.g., moving in an opposite direction of enlarging the gap, until reaching the first engagable location for the locking mechanism.

After placing the object between the jaws and locking the jaw assembly, one or both jaws can be adjusted, e.g., moved, so that the jaws are in contact with the object. The object can be moved so that it is in contact with the first jaw 261 (e.g., the jaw of the jaw assembly that cannot be moved), leaving a gap only between the object and the second jaw 241 (e.g., the jaw of the movable jaw assembly). Then the second jaw 241 can be slided downward 223 (FIG. 2A (c)) (and moving toward the object at a same time due to the slanting interface), until the object is in contact with the second jaw. A force can be applied to the push the second jaw downward so that there is a good friction between the jaws and the object. This is to ensure that the object will not slide out the grip of the jaws. With a good friction between the object and the jaws, the slanting interface will assist in converting the weight of the object into a clamping force, which can hold the object between the jaws.

After the jaws are adjusted, e.g., the jaws are in contact with the object, the clamping device can be slowly lifted up. The weight of the object can pull the second jaw 241 down, since the friction at the slanting interface 271 is less than the friction between the object and the first and second jaws 261 and 241. Due to the slanting interface, the downward force 211 of the object weight can be converted to a force 273 along the slanting interface, which can be converted to a sideward force 274 toward the object. The sideward force 274 can exert a force on the object, holding the object in place, preventing the object from going down, e.g., slipping out of the jaws.

Advantages of the clamping device using the slanting interface can include compact size, since the clamping device includes two opposite jaw assemblies connected by a clamp bar. Further, the force clamping on the object can be well distributed throughout the surface of the jaws, meaning no focused point.

Further, the contact surfaces of the clamping device with the object can be scalable, meaning large size jaw pads can be used to accommodate heavy objects. Together with evenly distributed force, the clamping device can be gentle on the object, meaning the clamping device can be used on heavy fragile objects, such as granite, glass or ceramic plates.

FIG. 2B shows another configuration for a clamping device. A clamping device 205 can include two jaw assemblies 245 and 265 coupled to a clamp bar 255. The jaw assembly 265 includes a jaw 266 and a jaw support 267, together with a first slanting interface there between. And the jaw assembly 245 includes a jaw 246 and a jaw support 247, together with a second slanting interface there between. A first locking mechanism 225 can be used to secure the jaw assembly 265 to the clamp bar. A second locking mechanism 275 can be used to secure the jaw assembly 245 to the clamp bar.

With two jaw support assemblies, the object can be symmetrically oriented, thus the two jaws 246 and 266 can be pulling down together by the weight of the object. The two jaws then can be sliding toward the object, due to the slanting interfaces, and exerting forces on the object, keeping the object in place and preventing the object from moving out of the clamp device.

FIGS. 3A-3C illustrate flow charts for forming and operating a clamping device according to some embodiments. In FIG. 3A, operation 300 forms a clamping device, wherein the clamping device comprises a jaw and a jaw support, wherein the jaw and the jaw support is coupled with a slanting surface, wherein the slanting surface is configured so that when the jaw moves down, the jaw also moves toward an object. The slanting surface can also be configured so that when there is a force comprising a downward direction acting on the jaw, there is a force comprising a sideward direction acting toward an object to be clamped by the clamping device.

In FIG. 3B, operation 320 forms a clamping device, wherein the clamping device comprises a clamp bar, a first jaw fixedly coupled to the clamp bar, and a jaw assembly movably and securely coupled to the clamp bar, wherein the jaw assembly comprises a second jaw and a jaw support, wherein the second jaw and the jaw support is coupled with a slanting surface, wherein the slanting surface is configured so that when the second jaw moves down, the second jaw also moves toward an object supported between the first and second jaw for keeping the object in place. The slanting surface can also be configured so that when there is a force comprising a downward direction acting on the second jaw, there is a force comprising a sideward direction acting toward the object.

In FIG. 3C, operation 340 places an object between a first jaw and a second jaw of a clamping device, wherein the second jaw is coupled to a jaw support with a slanting surface, wherein the slanting interface is configured so that when the object moves down, the object makes the second jaw moving toward the object for keeping the object in place.

The first and second jaws can be directly or indirectly coupled to a clamp bar. For example, the first jaw can be directly coupled to the clamp bar. The second jaw can be indirectly coupled to the clamp bar, e.g., the second jaw is coupled to jaw support while the jaw support is directly coupled to the clamp bar.

If the opening between the first jaw and the second jaw is not enough to accommodate the object, the first jaw, the second jaw, or the jaw support can be move along the clamp bar to enlarge the opening distance.

After placing the object between the jaws, the opening can be narrowed so that the object is in contact with the jaws, or there is a minimum gap between the object and the jaws. The first jaw, the second jaw, or the jaw support then can be securely coupled to the clamp bar.

If there is a gap between the object and the jaws, one or two jaws can be adjusted, e.g., changing the positions of the jaws or moving the jaws, so that the jaws can contact the object. For example, the jaws can be pressed down along the slanting interfaces. During the downward movements of the jaws, the jaws also move sideward toward the object. The jaws can be pressed down until the jaws are in contact with the object.

Operation 350 lifts the clamping device to move the object.

In some embodiments, the clamping device can include a pulling element, which is disposed between a jaw and a jaw support of a jaw assembly. A slanting interface can be included between the pulling element and at least one of the jaw and the jaw support. For example, there can be a slanting interface between the pulling element and the jaw support. There can be a second slanting interface between the pulling element and the jaw. The pulling element can simplify the operation of the clamping device, for example, by eliminating the adjustment of the jaws, e.g., moving the jaws so that the jaws can be in contact with the object if there are gaps between the jaws and the object after the jaw assemblies are secured to the clamp bar.

By pulling on the pulling element, when there is a gap, the jaw will move toward the object to narrow the gap. After the jaws are in contact with the object, further pulling action will exert a force from the jaws to the object, clamping the object in place. The clamping force can be evenly distributed at the clamping jaws.

Further, the pulling element can improve the clamping force on the object, for example, due to the wedging configuration of the jaw and the jaw support. The high clamping force can improve the gripping action of the clamping device on the object, further preventing the object from slipping out of the jaws of the clamping device.

In some embodiments, the present invention discloses a clamping device for lifting and/or for transferring heavy objects, such as granite plates, cement blocks, metal plates, and objects of other shapes and materials. The clamping device can grip the objects by clamping on portions of the objects, such as at edges of the objects.

The present clamping device can lift an object, or multiple objects placing next to each other, such as lifting a plate or a stack of multiple plates. The clamping device can be used for lifting heavy plates with large thicknesses without damaging the lifted plates, such as without deforming or cracking the plates. The center of the clamping action can be evenly distributed to the clamping jaws, to provide an even clamping force on the objects.

Further, the clamping device can be compact and light weight, e.g., which can include two jaw assemblies coupled to a clamp bar. The small size of the clamping device can allow the clamping device to be placed in the gaps of multiple objects to clamp on the selected object. For example, multiple heavy plates can be stacked against each other in a facility with small gaps in between. The clamping device can be placed at the gaps, and enclosing the plate to be clamped.

The small size and light weight of the clamping device can allow the clamping device to easily move along the object, for example, so that the clamping device can clamp on a vertical line with the center of gravity of the object. The alignment of the clamping device with the center of gravity can prevent excessive tilting of the object when lifted.

Figure 4A:
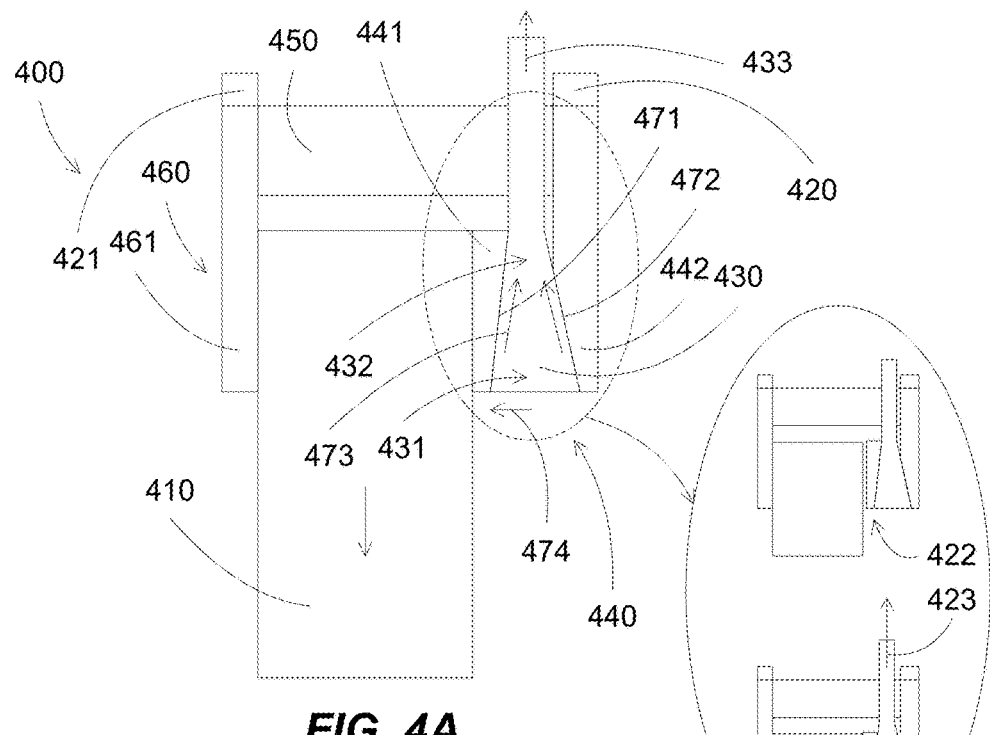
FIGS. 4A-4B illustrate clamping devices according to some embodiments.
Figure 4B:
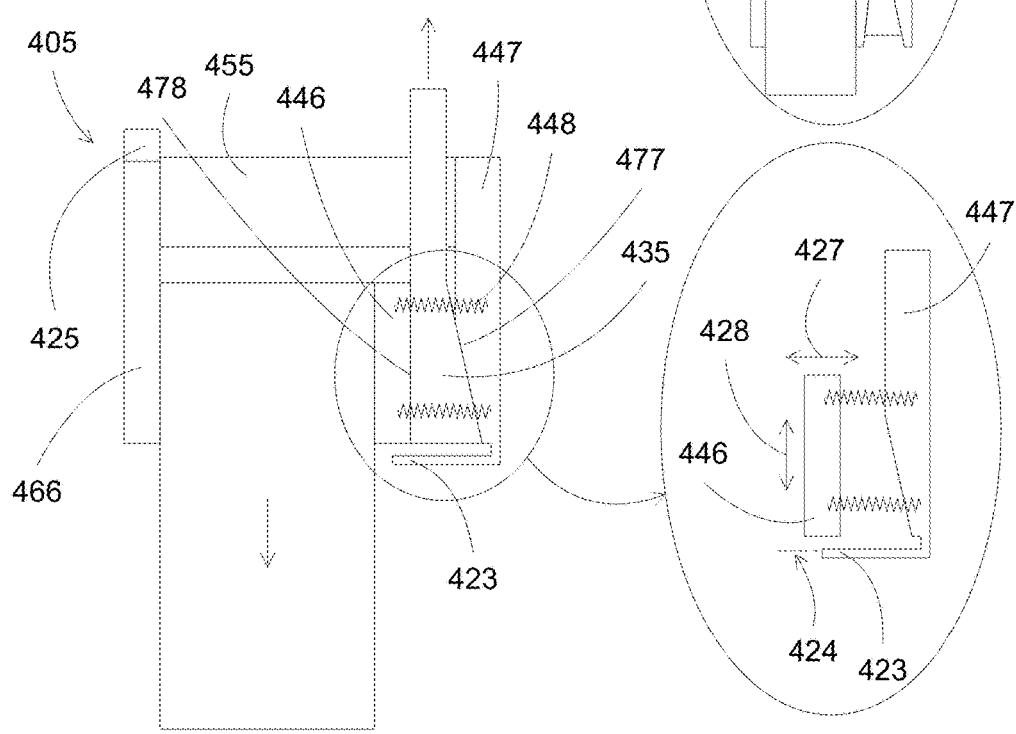

FIGS. 4A-4B illustrate clamping devices according to some embodiments. In FIG. 4A, a clamping device 400 can include two jaw assemblies 440 and 460 coupled to a clamp bar 450. The jaw assembly can include a jaw, or a jaw and a jaw support. As shown, the jaw assembly 460 includes a jaw 461. And the jaw assembly 440 includes a jaw 441 and a jaw support 442.

The jaw assembly can be fixedly coupled to the clamp bar, or can be movably and securably (or lockably) coupled to the clamp bar, using an optional locking mechanism. As shown, the jaw assembly 460 is movably coupled to the clamp bar 450, together with a locking mechanism 421 for securing the jaw assembly 460 to the clamp bar 450. And the jaw assembly 440 is movably coupled to the clamp bar 450, together with a locking mechanism 420 for securing the jaw assembly 440 to the clamp bar 450.

The jaw assemblies 440 and 460 each can include a jaw for clamping on an object 410. For example, the jaw assembly 460 can include a first jaw 461. The jaw assembly 440 can include a second jaw 441, which together with the first jaw 461, pressing on the object 410 for clamping the object. The jaw assemblies can be fixedly or movably coupled to the clamp bar. For example, the jaw assembly 460 can be movably coupled to the clamp bar 450 by the first jaw 461 movably along the clamp bar 450. The jaw 461 can be secured to the clamp bar by the locking mechanism 421, for example, through a latching mechanism that latches the jaw 461 to the clamp bar 450.

The jaw assemblies can be movable along to the clamp bar, e.g., to accommodate different sizes of the object. Once the jaw opening between the jaws 441 and 461 is large enough to clamp on the object 410, the jaw support 440 can then be fixed to the clamp bar 450. For example, the jaw assembly 440 can be movable along the clamp bar 450 by sliding the jaw support 442 along the clamp bar 450. A locking mechanism 420 can be included to lock, e.g., to secure, the jaw assembly 440 to the clamp bar 450, for example, by latching the jaw support 442 to the clamp bar 450.

A pulling element 430 can be disposed between the jaw 441 and the jaw support 442 of the jaw assembly 440. The pulling element can be loosely coupled to the clamp bar. For example, the pulling element can include a hollow space, such as a through hole, in which the clamp bar can pass through. The hollow space can be larger than the cross section of the clamp bar, so that the pulling element can move relative to the clamp bar.

In some embodiments, the pulling element can be constrained to move in the up and down directions, e.g., in the directions of gravity. Thus the hollow space of the pulling element can be larger above and below the clamping bar, to allow the pulling element to move up and down with respect to the clamp bar. The hollow space can be close to the clamp bar at sides, such as in contact or having a small gap. The closeness of the pulling element and the clamp bar in sideward directions, e.g., in directions perpendicular to the gravity directions, can constrain the pulling element from moving in the sideward directions.

There can be slanting interfaces between the pulling element and the jaw assembly in which the pulling element is disposed within. For example, slanting interface 471 can be between the pulling element 430 and the jaw 441. Slanting interface 472 can be between the pulling element 430 and the jaw support 442. There can be two slanting interfaces, or there can be one slanting interface, with the other interface being a non-slanting interface, e.g., a vertical surface or a tilted surface sloped in an opposite direction as the slanting interface. As shown, the pulling element can move up and down along the slanting interfaces 471 and 472.

The slanting interfaces can be configured so that when the pulling element moves up, e.g., in a direction 433 for lifting the object, the jaw can move in a direction that increase a separation between the jaw and the jaw support. For example, a bottom portion 431 of the pulling element, e.g., a dimension of the pulling element at the bottom portion 431 in a direction between the jaw and the jaw support, can be larger than a top portion 432 of the pulling element, e.g., a dimension of the pulling element at a top portion 432 in a direction between the jaw and the jaw support, or a dimension of the pulling element at a portion above the dimension of the pulling element at a top portion 431, in a direction between the jaw and the jaw support.

That way, when the pulling element moves up, the larger bottom portion also moves up, further separating the jaw and the jaw support. The slanting interface between the pulling element and the jaw support can provide that the corresponding bottom portion of the jaw support can be smaller than the corresponding top portion of the jaw support. The slanting interface between the pulling element and the jaw can provide that the corresponding bottom portion of the jaw can be smaller than the corresponding top portion of the jaw.

In some embodiments, the slanting interfaces can be provided at a portion of the surface that the pulling element is facing the jaw or the jaw support. Thus a bottom portion 431 or a top portion 432 of the pulling element can be only a portion of the interface between the pulling element and the jaw/jaw support.

The slanting interfaces 471 and 472 can be configured so that when the pulling element 430 starts to move up 433, the pulling element can move along the slanting interfaces. With the slanting interfaces, the jaw 441 can also start to move away 474 from the jaw support since the jaw support is secured to the clamp bar by the locking mechanism 420. The potential side movement of the second jaw can exert a force on the object, preventing the object from moving down, e.g., to clamp the object in place.

The slanting interface can be configured so that the second jaw 441 can be moving toward the object 410 when the pulling element 430 is moving up. Thus, if there is no obstacle blocking the movement of the second jaw, e.g., the object is not present or the object is not in contact with the second jaw, the second jaw is moving toward the object or away from the jaw support when the pulling element is moving upward.

The slanting interface can be configured so that when there is an upward force 433 acting on the pulling element 430, there is an upward force 473 (e.g., a force having a component in the upward direction) along the slanting interfaces. The upward force 473 can be converted to a sideward force 474 toward the object. The conversion of the upward force can be viewed as a decomposition or a splitting of the upward force into multiple force components, in which a force component has a sideward direction. Thus, if there is no obstacle blocking the movement of the jaw, e.g., the object is not present or the object is not in contact with the jaw, the jaw is moving toward the object (in addition to the jaw potentially moving down) when there is the upward force acting on the pulling element. If there is an obstacle blocking the movement of the jaw, e.g., the object is in contact with the jaw, there is a sideward force from the jaw pressing on the object.

The slanting interface can include a slanting surface 471 making an acute angle with a vertical plane with a top portion of the slanting surface away from the object more than a bottom portion of the slanting surface. The slanting surface can be tilted toward the object at a bottom portion, or tilted away from the object at a top portion.

The slanting interface can include a slanting surface 472 making an acute angle with a vertical plane with a top portion of the slanting surface nearer the object more than a bottom portion of the slanting surface. The slanting surface can be tilted away from the object at a bottom portion, or tilted toward the object at a top portion.

The slanting interface can have a low friction surface, e.g., lower than the friction between the object 410 and the jaws 461 and 441. For example, the jaws 461 and 441 can include a rubber layer facing the object, which can have high friction toward the object.

There can be one or two slanting interfaces. The combination of these slanting interfaces is configured so that the jaw moves toward the object when the pulling element moves up, and that the jaw moves away from the object when the pulling element moves down. For example, there can be two slanting interfaces 471 and 472, and both of them are configured to exert a force toward the object when the pulling element experience an upward force.

There can be one slanting interface 477, for example, as shown in FIG. 4B, between a pulling element 435 and a jaw support 447. The interface 478 between the jaw 425 and the pulling element 435 can be a non-slanting surface, such as a vertical surface. Other configurations can be used, such as the surface 478 can be slanted either way (same as the slanting surface 471 or can be tilted the opposite way, as long as the combination of the two surfaces is configured to move the jaw toward the object when the pulling element moves up). Alternatively, the slanting surface 477 can be tilted oppositely or can be vertical.

In operation, the object is first clamped between the jaws 461 and 441 of the clamping device. For example, the locking mechanism 421 can be engaged to secure the jaw 461 to the clamp bar 450. The locking mechanism 420 can be disengaged, so that the jaw support 442 is free to move along the clamp bar 450. The jaw assembly 440 can be moving away from the jaw assembly 460 to enlarge the opening between the jaw 461 and 441. Once the opening is large enough to accommodate the object, the object can be placed between the jaws. The jaw assembly 440 can then be moving toward the object so that the object is in contact with the jaws, or so that there is a minimum gap between the object and the jaws. The jaw assembly 440 then can be secured to the clamp bar, for example, by engaging the locking mechanism 420.

Alternatively, the jaw assembly 440 can be locked first, and the jaw assembly 460 can be adjusted to ensure a minimum gap between the object and the jaws.

There can be a gap 422 between the object and the jaws, if the locking mechanism 420 is a discrete locking mechanism, e.g., the locking mechanism can secure the jaw assembly 440 to the clamp bar 450 at discrete locations, and the engagable locations for the current object do not allow the object to be in contact. The location to engage the locking mechanism can be selected to ensure a minimum gap between the object and the jaws, meaning the total gap between the object and the first jaw and between the object and the second jaw is smaller than the distance between two successive locking locations of the locking mechanism.

After placing the object between the jaws and locking the jaw assemblies, the pulling element can be pulled up. For example, the pulling element can be coupled to a hoist, and the hoist can move upward. The upward movement 423 of the pulling element can push the jaw 441 toward the object, closing the gap 422 until the jaw 441 is in contact with the object. A slow upward pulling of the pulling element can be applied when the jaws are not yet in contact with the object, so that the object does not escape the clamping element.

After the jaws clamp on the object, the pulling element, e.g., the hoist, can be further pulled up to lift the object. The hoist then can move and transfer the object to a new location.

Additional advantages of the clamping device having a pulling element include that the jaw can be fixed in location with respect to the object, meaning the pulling element can move to press on the jaw without the need to move the jaw. A further advantage of the clamping device having a pulling element is a high transfer coefficient between the upward force of the pulling element and the sideward force of the jaw on the object.

In some embodiments, in a jaw assembly, the jaw and the jaw support can be flexibly coupled, e.g., there can be limited movements of the jaw relative to the jaw support. For example, the jaw can include hollow spaces, such as through holes. One or more rods or bars can pass through the hollow spaces, which constrain the movements of the jaw. The hollow spaces can be larger than the rods or bars, e.g., larger than a cross section of the rods or bars, thus the jaw can move within the constraints of the rods and bars. For example, the jaw can slide in a direction along the rods or bars. With the hollow spaces larger than the rods or bars, the jaw can also move in a direction perpendicular to the direction along the rods or bars.

In addition, by shaping the hollow spaces with respect to the rods or bars, the jaw can be further constrained to move in linear directions instead of moving in a plane perpendicular to the rods or bars. For example, the hollow spaces can include elongated holes along up and down directions. The elongated hollow spaces thus can allow the rods or bars to move within the hollow spaces in the up and down directions. The elongated holes can form minimum gaps with the rods or bars in horizontal directions perpendicular to the up/down directions and to the directions along the rods or bars. Thus the rods or bars is constrained, e.g., not able to move in the horizontal directions perpendicular to the up/down directions and to the directions along the rods or bars. With the elongated hollow spaces in the jaw, the jaw can move in upward direction, downward directions, direction toward the jaw support, and direction away from the jaw support.

FIG. 4B shows a clamping device 405, including a clamp bar 455, a jaw assembly including a first jaw 466, and a jaw assembly including a second jaw 446 and a jaw support 447. The first jaw 466 can be secured to the clamp bar 455 by a locking mechanism 425. A pulling element 435 can be disposed between the second jaw 446 and the jaw support 447. The pulling element can be movably coupled to the clamp bar, e.g., coupled to the clamp bar but can move in up and down directions.

The pulling element can form a slanting interface 477 with the jaw support 447, and a vertical plane interface 478 with the second jaw 446.

The jaw 446 can be flexibly coupled to the jaw support 447, e.g., the second jaw can be coupled to the jaw support with limited movements and/or with constrained movements. For example, the second jaw 446 can be coupled to the jaw support 447 through one or more springs 448. The spring coupling can allow the jaw to move in all directions with respect to the jaw support, such as moving in up or down directions 428, or moving in toward or away directions 427 relative to the jaw support. However, the spring coupling can constrain the second jaw to have limited movements. For example, the springs can extend when the second jaw moves away from the jaw support, but the second jaw cannot move too far away from the jaw support, or the springs 448 would break. Similarly, the springs can contract when the second jaw moves toward the jaw support. The springs can bend when the second jaw moves up or down relative to the jaw support. An advantage of the spring coupling is that when the clamping device is at rest, e.g., when the pulling element is at a lowest position, the springs can pull the second jaw back toward the jaw support. This can allow the clamping device to freely approach object for clamping, since the jaws are at positions that maximize the opening distance between the two jaws.

In some embodiments, a pulling element lock can be included to secure the pulling element to a rest position, e.g., a lowest position or a position that allows the second jaw to be closest to the jaw support. Together with the spring coupling, locking the pulling element can pull the jaws back to positions with largest jaw opening.

In some embodiments, there can be a limiter to restrict the movements of the jaw with respect to the jaw support. The limiter can be coupled to the jaw support, and include a stopper to prevent the jaw from moving pass a certain position. The limiter can be coupled to other components, such as coupled to the clamp bar, or to any component that is fixed coupled to the jaw support. For example, the jaw support 447 can include a limiter 423, which can constrain the second jaw 446 from moving down too far, e.g., stopping at the limiter limit 424. Alternatively, the rods or bars passing through the hollow spaces in the second jaw can also act as limiters for the second jaw, limiting the movements of the second jaw in directions perpendicular to the directions along the rods or bars.

In some embodiments, the slanting interfaces can have low friction, e.g., lower than the friction at the interfaces between the jaws and the object. For example, the friction at the interfaces between the jaws and the object can be increased by adding a high friction layer, such as a rubber pad, to the jaw external surfaces. Alternatively, the friction at the slanting interface can be reduced by using rolling friction, e.g., the pulling element can include rollers, which roll on a surface of the jaw, providing a rolling friction at the slanting interface between the pulling element and the jaw; or the rollers can roll on a surface of the jaw support, providing a rolling friction at the slanting interface between the pulling element and the jaw support. Inversely, the jaw or the jaw support can include rollers for rolling on surfaces of the pulling element.

FIGS. 5A-5B illustrate flow charts for forming and operating a three-part clamping device according to some embodiments. In FIG. 5A, operation 500 forms a clamping device, wherein the clamping device comprises a first jaw fixedly coupled to a clamp bar, and a second jaw assembly movably and fixedly coupled to the clamp bar, wherein the second jaw assembly comprises a second jaw and a jaw support, together with a pulling element disposed between the second jaw and the jaw support, wherein there is at least a slanting interface coupling between the pulling element and the second jaw or between the pulling element and the jaw support, wherein the slanting interface is configured so that when the pulling element moves up, the second jaw moves toward an object for keeping the object in place.

In FIG. 5B, operation 520 places an object between a first jaw and a second jaw of a clamping device, wherein the second jaw is part of a jaw assembly, wherein the jaw assembly further comprises a jaw support and a pulling element disposed between the second jaw and the jaw support, wherein there is at least a slanting interface coupling between the pulling element and the second jaw or between the pulling element and the jaw support.

In some embodiments, a distance between the first jaw and the second jaw can be enlarged, for example, by disengaging a locking mechanism that is used to secured the jaw assembly to a clamp bar. If there is two locking mechanisms, either one can be disengaged. After the locking mechanism is disengaged, the jaw assembly can be freely moved along the clamp bar, and the jaw assembly can be moved away from the other jaw or the other jaw assembly.

After placing the object in between the jaws, the distance between the first jaw and the second jaw can be narrowed, for example, by moving one jaw assembly toward the other jaw assembly. For example, if the first jaw assembly is fixedly coupled to the clamp bar, then the second jaw assembly can be pushed toward the first jaw assembly to narrow the distance between the two jaws. The second jaw assembly can be stopped, e.g., after being pushed toward the first jaw assembly, when the total gap between the object and the jaws is minimum.

Operation 530 optionally locks the jaw assembly so that the object is disposed between the first jaw and the second jaw. The locking mechanism can be a discrete locking mechanism, meaning the jaw assembly can be secured to the clamp bar at discrete locations. The jaw assembly is then locked, e.g., the locking mechanism is engaged, at a location that the total gap between the object and the jaws is minimum, e.g., the total gap is smaller than a distance between two discrete locations that the locking mechanism can be engaged.

Operation 540 lifts the pulling element which moves the second jaw toward the object, since the slanting interface is configured so that when the pulling element moves up, the second jaw moves toward the object. The pulling element can be lifted slowly, to ensure that the object is still placed on the ground when there is a gap between the object and the jaws. After the jaws contact the object, the pulling element can be further lifted to lift the object from the ground. The pulling force, and/or the weight of the object, can be converted to a clamping force of the jaws against the object, keeping the object within the grip of the clamping device.

In some embodiments, one or more slanting interfaces of the clamping device can have a low friction, such as a low coefficient of friction. The friction of the slanting interfaces can be lower than that of the gripping interfaces, e.g., the interfaces between the object and the jaws gripping the object.

The lower friction can be achieved by increasing the friction of the gripping interfaces or gripping surfaces. For example, the jaw outer surfaces, e.g., the surfaces of the jaws to be in contact with the object, can have a high friction layer disposed thereon. For example, a rubber layer can be coupled to the jaw, to increase the friction of the jaw with the object, which can prevent the object from slipping from the jaw during the handling of the object.

The lower friction can be achieved by decreasing the friction of the slanting interfaces. For example, the slanting interfaces, e.g., the mating surfaces between two parts in the jaw assembly, such as the interface between the jaw and the pulling element, or the interface between the pulling element and the jaw support, can have smoother surfaces, such as having a grease coating, or low contact area surfaces, such as rolling frictions from balls or rollers. The low friction interfaces can make it easier for the pulling element to move with respect to the jaw while the jaws grip the object.

For example, the pulling element can have rolling balls on one or two surfaces, e.g., on one surface facing the second jaw, or on one surface facing the jaw support, or on both surfaces. Alternatively, the second jaw can have rolling balls on the surface facing the pulling element, or the jaw support can have rolling balls on the surface facing the pulling element.

Figure 6A:
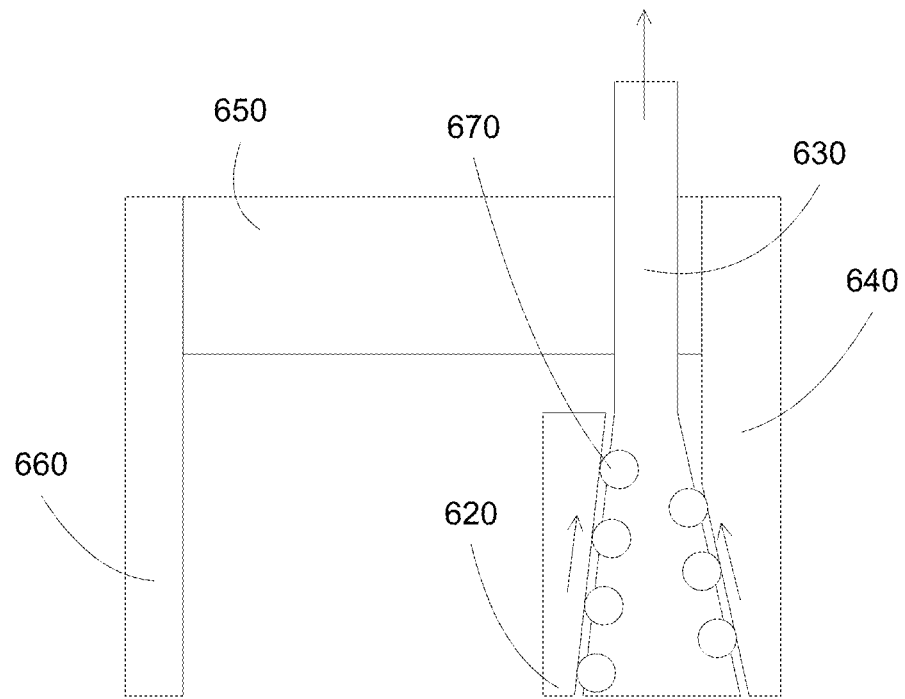
FIGS. 6A-6B illustrate configurations for clamping devices with rolling frictions according to some embodiments.
Figure 6B:
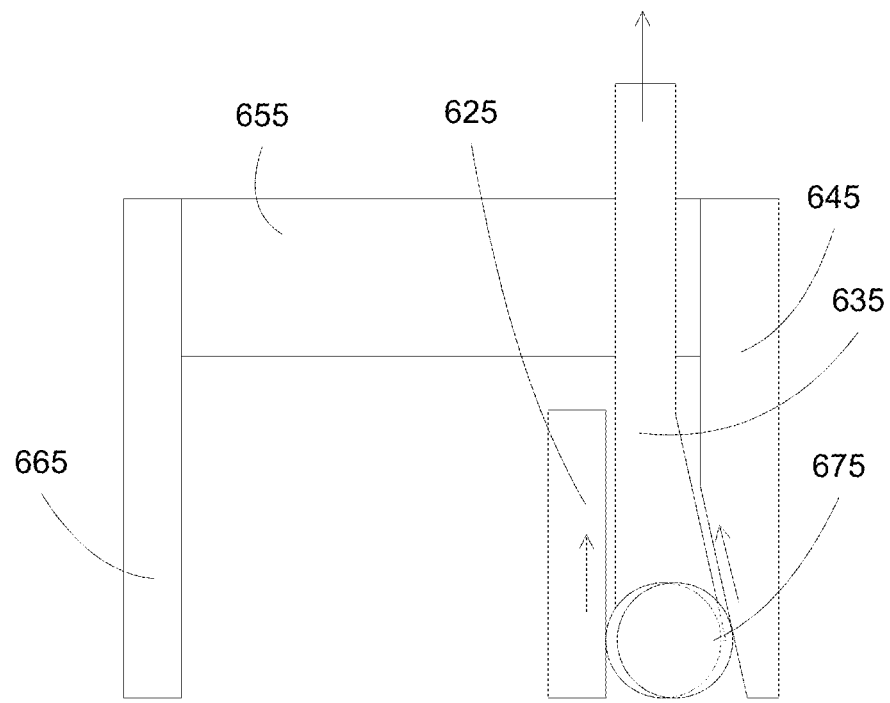

FIGS. 6A-6B illustrate configurations for clamping devices with rolling frictions according to some embodiments. In FIG. 6A, a clamping device can include a first jaw 660 fixedly coupled to a clamp bar 650; a movable and fixable (e.g., lockable) jaw support assembly that includes a second jaw 620, a jaw support 640; and a pulling element 630 disposed between the second jaw and the jaw support. The interfaces between the pulling element and the second jaw and between the pulling element and the jaw support can include slanting surfaces, for translating a vertical movement of the pulling element to a horizontal movement of the second jaw.

The pulling element can have one or more rolling balls or rollers 670 on one or both interfaces, meaning on a surface facing the second jaw and/or on a surface facing the jaw support. The rolling balls or rollers can provide a low friction interface between the pulling element and the second jaw and/or the jaw support.

In FIG. 6B, a clamping device can include a first jaw 665 fixedly coupled to a clamp bar 655, and a movable and fixable (e.g., lockable) jaw support assembly that includes a second jaw 625, a jaw support 645, and a pulling element 635 disposed between the second jaw and the jaw support. The interface between the pulling element and the second jaw can be a substantially vertical surface. The interface between the pulling element and the jaw support can include a slanting surface, for translating a vertical movement of the pulling element to a horizontal movement of the second jaw. Other interface configurations can be included for different surface configurations.

The pulling element can have rolling balls or rollers 675 on one or both interfaces, meaning on a surface facing the second jaw and/or on a surface facing the jaw support. One set of rolling balls or rollers can be used. As shown, the rolling balls or rollers have offset centers, so that the left rolling balls or rollers can roll on the surface of the jaw 625 and the right rolling balls or rollers can roll on the surface of the jaw support 645.

In some embodiments, the rolling balls or roller can have centers of rotation aligned in a horizontal line. Recesses in the jaw and/or in the jaw support can be included, so that the rolling balls or roller only contact the jaw or the jaw support. For example, a roller can contact the jaw and the surface of the jaw support facing the roller can be recessed, so that the roller does not contact the jaw support.

FIGS. 7A-7B illustrate flow charts for forming and operating clamping devices with rolling frictions according to some embodiments. In FIG. 7A, operation 700 forms a clamping device, wherein the clamping device comprises a first jaw fixedly coupled to a clamp bar, and a second jaw assembly movably and fixedly coupled to the clamp bar, wherein the second jaw assembly comprises at least two components coupled through a slanting surface interface, wherein the slanting surface is configured so that when one component moves down, it also moves toward an object disposed between the first jaw and the second jaw assembly, wherein the slanting surface comprises a rolling friction.

In some embodiments, the second jaw assembly comprises a second jaw and a jaw support, together with a pulling element disposed between the second jaw and the jaw support, wherein there is at least a slanting surface interface between the pulling element and the second jaw or between the pulling element and the jaw support, wherein the slanting interface is configured so that when the pulling element moves up, the second jaw moves toward an object for keeping the object in place, wherein the slanting surface comprises a rolling friction.

In FIG. 7B, operation 720 places an object between a first jaw and a second jaw of a clamping device, wherein the second jaw is part of a jaw assembly, wherein the jaw assembly further comprises a jaw support and a pulling element disposed between the second jaw and the jaw support, wherein there is at least a slanting surface interface coupling the pulling element and the second jaw or coupling the pulling element and the jaw support, wherein the slanting surface comprises a rolling friction.

Operation 730 optionally locks the jaw assembly so that the object is disposed between a fixed first jaw and a fixed jaw support. Operation 740 lifts the pulling element which moves the second jaw toward the object, since the slanting surface interface comprises a rolling friction, the second jaw moves toward the object when the pulling element moves up.

In some embodiments, a locking mechanism can be formed to secure a movable jaw assembly to the clamp bar. The locking mechanism can be used to secure the jaw or the jaw support of a movable jaw assembly to the clamp bar.

The jaw assembly can be fixedly coupled to the clamp bar, e.g., the jaw assembly cannot be moved. For example, a jaw or a jaw support of the fixed jaw assembly can be secured to the clamp bar, for example, with bolts.

The jaw assembly can be movable along the clamp bar to accommodate different sizes of the objects. For example, the jaw or the jaw support of the jaw assembly can have a hollow portion for the clamp bar to pass through.

The locking mechanism can secure the movable jaw assembly to the clamp bar. The locking mechanism can be continuous, meaning the jaw assembly can be moved and secured, e.g. locked, along the clamp bar until the object is placed between the two jaws, meaning there is zero or a very little gap between the object and the jaws.

The continuous locking mechanism can include a screw type, meaning a lead screw can be used to move the jaw support assembly along the clamp bar. A lock, such as a screw or a clamp to lock the lead screw or to lock the handle that turn the lead screw.

The locking mechanism can be discrete, meaning the jaw assembly can be moved continuously along the clamp bar, but can only be secured, e.g. locked, at predetermined locations along the clamp bar. Thus the jaw assembly can move from a lockable location to another lockable location, until there is minimum gaps between the object and the jaws, meaning the next lockable location would not be large enough to accommodate the object.

The discrete locking mechanism can include a peg fitting into one of multiple holes, or a cyclic pattern bar (such as a rack bar, or a bar having repeat triangle shapes)

A cyclic pattern bar and a mating pattern component can be used for securing the jaw support assembly to the clamp bar at discrete locations, meaning at locations that the pattern of the patent component fitted to one of the multiple patterns of the cyclic pattern bar. For example, the pattern can be a triangle. The pattern component can have a recess with the shape of the triangle. The cyclic pattern bar can have multiple mating triangles, e.g., triangles that match with the triangle of the pattern component, such as with the base of the triangles at the base of the cyclic pattern bar, and the tip of the triangle protruded from the base. Alternatively, the pattern component can have one or more triangles protruded from the pattern component. The cyclic pattern bar can have multiple recesses of triangle shapes.

FIGS. 8A-8C illustrate configurations for clamping devices with locking mechanisms according to some embodiments. In FIG. 8A, a clamping device 800 can have a locking mechanism 870 for securing a movable jaw assembly, such as securing a jaw support 840, to a clamp bar 850. The locking mechanism 870 can include a cyclic pattern bar 871, such as a rack bar, a tooth bar, a cog bar, or a linear gear bar. The cyclic pattern bar 871 can be fixedly coupled to the clamp bar. The locking mechanism 870 can include a mating pattern component 872, such as a rod or a bar having a mated pattern at one end, such as a tooth pattern, a gear pattern, or a cog pattern. The mating pattern component 872 can be movably coupled to the jaw assembly, such as to the jaw support 840. For example, the mating pattern component 872 can be movable 873, such as pulling back for disengaging with the cyclic pattern bar 871. In this disengaged position, the jaw assembly can be free to move along the clamp bar. The mating pattern component 872 can be pushed up, contacting the cyclic pattern bar 871 to engage with the cyclic pattern bar 871. In this engaged position 841, the jaw assembly can be locked to the clamp bar.

As shown, the mating is in the shape of triangles, e.g., the cyclic pattern bar can have multiple triangles protruded from a base, and the pattern component can have multiple triangular recesses. Thus the jaw support can be locked onto various locations of the cyclic pattern bar. For example, the jaw component can be released from the cyclic pattern bar, such as by pulling the jaw support assembly in a downward direction. The released jaw support assembly can be moved along the clamp bar (and the cyclic pattern bar), to adjust the size of the opening between the first jaw and the second jaw, to accommodate different object sizes. At the appropriate opening size, the jaw support assembly can be engaged, meaning the pattern component is engaged with the cyclic pattern bar, to lock the jaw support assembly in place.

In some embodiments, one way pattern locking can be used, meaning the jaw support assembly can be moved along the clamp bar to narrow the opening between the two jaws, but cannot be moved in the opposite direction to enlarge the opening. For example, the triangle pattern can have an acute angle in one side and an obtuse angle in another side. The asymmetric triangle can prevent movement against the acute side while allowing movement against the obtuse side.

In some embodiments, the pattern can be asymmetric, for example, so that the jaw assembly can be easier to move toward the object, while it is much more difficult to move back away from the object. This will provide a further security against the losing the clamping action of the clamping device.

In FIG. 8B, a clamping device 805 can have a locking mechanism 875 for securing a movable jaw assembly, such as securing a jaw support 845, to a clamp bar 855. The locking mechanism 875 can include a cyclic pattern configuration 876, such as a series of holes on the clamp bar. The locking mechanism 870 can include a mating pattern component 877, such as a pin, a rod or a bar which can fit into the holes. The mating pattern component 877 can be movably coupled to the jaw assembly, such as to the jaw support. For example, the mating pattern component 877, e.g., the pin 877, can be movable 878, such as pulling back for disengaging with the clamp bar, e.g., out of the hole 876. In this disengaged position, the jaw assembly can be free to move along the clamp bar. The mating pattern component 877, e.g., the pin 877, can be pushed up, entering one hole in the holes 876 in the clamp bar. In this engaged position 842, the jaw assembly can be locked to the clamp bar.

The jaw support can include a pattern component 877, which is a peg, which can be mated to various positions of a cyclic pattern bar 876, which includes multiple holes. As shown, the mating is in the shape of pegs and holes, e.g., the cyclic pattern bar can have multiple holes, and the pattern component can have a peg, such as a round peg. Thus the jaw support can be locked onto various locations of the cyclic pattern bar. For example, the jaw component can be released from the cyclic pattern bar, such as by pulling the peg in a generally downward (or sideway) direction. The released jaw support assembly can be moved along the clamp bar (and the cyclic pattern bar), to adjust the size of the opening between the first jaw and the second jaw, to accommodate different object sizes. At the appropriate opening size, the jaw support assembly can be engaged, meaning the pattern component is engaged with the cyclic pattern bar, to lock the jaw support assembly in place.

FIG. 8C shows an operation to clamp the object with the clamping device with a discrete locking mechanism. The lock mechanism can be disengaged, e.g., the pattern component can be pulled back 836, so that the pattern component is disengaged 882 from the cyclic pattern bar. The jaw support assembly can be slid back to enlarge the opening between the two jaws. An object 810 can be placed between the two jaws. The jaw support assembly can be slide forward to make sure that the total gaps 812+814 between the jaws and the object is minimum, meaning that that total gaps are the smallest when the lock mechanism is engaged.

The lock mechanism is then engaged, e.g., the pattern component can be pushed up 838 toward the cyclic pattern bar, so that the pattern component is engaged 883 with the cyclic pattern bar. The jaw assembly is now fixedly coupled to the clamp bar.

The pulling element 837 can be pulled up, e.g., in a substantially vertical direction 885. Due to the slanting surface between the jaw support and the pulling element 837, and since the jaw support is locked, the upward movement 885 of the pulling element can have a component moving toward the object, e.g., the pulling element moves in a direction 886 upward and toward the object.

The side movement of the pulling element can move the second jaw 827 toward the object, until the second jaw is in contact with the object.

When the second jaw is not yet in contact with the object, the second jaw can be freely moved, and therefore the second jaw can move in a downward direction 884 (due to gravity) toward the object, meaning sliding vertically down and horizontally sideway.

When the second jaw contacts the object, the upward movement 885 of the pulling element can push on the second jaw. With a good friction between the second jaw and the object, the second jaw can only be pushed toward the object without actually moving, thus clamping on the object.

FIGS. 9A-9B illustrate flow charts for forming and operating clamping devices with rolling frictions according to some embodiments. In FIG. 9A, operation 900 forms a clamping device, wherein the clamping device comprises a first jaw fixedly coupled to a clamp bar, and a second jaw assembly movably and fixedly coupled to the clamp bar, wherein the second jaw assembly comprises a locking mechanism for fixedly coupling the second jaw assembly to the clamp bar, wherein the locking mechanism is configured to secure the second jaw assembly to the clamp bar continuously or at discrete locations.

In FIG. 9B, operation 920 an object between a first jaw and a second jaw of a clamping device, wherein the second jaw is part of a jaw assembly, wherein the jaw assembly further comprises a locking mechanism for securing the jaw assembly with respect to the first jaw, wherein the locking mechanism is configured to secure the jaw assembly at discrete locations.

Operation 930 unlocks the locking mechanism to place an object between the first jaw and the second jaw. Operation 940 locks the locking mechanism at a location to achieve a minimum gap between the first and second jaws with the object. Operation 950 lifts the clamping device to secure the object between the first and second jaws. Operation 960 lifts the clamping device to move the object.

FIGS. 10A-10D illustrate a clamping device according to some embodiments. FIG. 10A shows a cross section of a clamping device, which can include a first jaw 1060 fixedly coupled to a clamp bar 1050. The first jaw can include a rubber pad 1065 to increase a friction with objects to be clamped. In some embodiments, the first jaw can be removably coupled to the clamp bar, together with a locking mechanism for securing the first jaw to the clamp bar. Alternatively, the first jaw can be a part of a first jaw assembly, which can also include a first jaw support. The first jaw of the first jaw support can be coupled to the clamp bar, such as fixedly coupled or removably coupled with a locking mechanism.

The clamping device can include a second jaw assembly, which can be movably and lockably coupled to the clamp bar. The second jaw assembly can include a second jaw 1041 disposed opposite the first jaw. The second jaw can include a rubber pad 1045 to increase a friction with objects to be clamped. The second jaw assembly can include a jaw support 1042, which can slide along the clamp bar for movably coupled to the clamp bar. As shown, the first jaw is fixedly coupled to the clamp bar, and the second jaw assembly is movably coupled to the clamp bar. Other configurations can be used, such as the first jaw is movably coupled to the clamp bar, and the second jaw assembly is fixedly coupled to the clamp bar. Alternatively, the first jaw and the second jaw assembly can both be movably coupled to the clamp bar. A jaw or a jaw assembly, if movably coupled to the clamp bar, can include a locking mechanism for securing the jaw or the jaw assembly to the clamp bar.

There can be flexible couplings between the second jaw and the jaw support. The flexible couplings can allow the second jaw to move in multiple directions with respect to the jaw support, such as down and away from the jaw support. The flexible couplings can include springs 1075 (FIG. 10D) having two ends fixedly coupled to the second jaw 1041 and the jaw support 1042. The springs can bend and flex, allowing the second jaw to move relative to the jaw support.

In addition, end point limits can be included to prevent the second jaw from moving too far from the jaw support. The second jaw can be blocked in the horizontal directions by the jaw support and the object, so there can be no need for end point limits in the horizontal directions. Support bars 1055 (FIG. 10C) can be coupled to the clamp bar and passing through the second jaw with large openings 1056. Thus the second jaw can be freely moved within the confinement of the openings. For example, the second jaw cannot move too far down, since the support bar can prevent such as movement. The openings 1056 can be configured to limit the movements of the second jaw. For example, the openings can be close or touching the support bars in horizontal directions, e.g., the openings can have an elongated shape in the up and down directions. The elongated openings can prevent the second jaw from moving in directions parallel to the jaw support, e.g., perpendicular to the up/down directions and perpendicular to the directions of toward to/away from the jaw support.

The second jaw assembly can be movably coupled to the clamp bar by having the jaw support movably coupled to the clamp bar, and the second jaw flexibly coupled to the jaw support. For example, the jaw support can have a hollow space in which the clamp bar can pass through (FIG. 10B). The dimension of the hollow space can be just about the size of the cross section of the clamp bar, which can allow the jaw support to move along the clamp bar, with zero or minimum movements in other directions, such as in directions perpendicular to the direction along the clamp bar.

The second jaw assembly can include a locking mechanism having first mated component 1071, e.g., the cyclic pattern bar, and second mated component 1072, e.g., the mating pattern component, for locking the jaw assembly, such as locking the jaw support, to the clamp bar. When the locking mechanism is disengaged (FIG. 10B), e.g., when the second mated component 1072 is pulled back to not contacting or not mating with the first mated component 1071, the jaw support 1042 can be freely moved along the clamp bar. When the locking mechanism is engaged (FIG. 10A), e.g., when the second mated component 1072 is pushed up to contact or mate with the first mated component 1071, the jaw support 1042 can be securely and fixedly coupled to the clamp bar.

The clamping device can include a pulling element 1030, which can be configured to be pulled on for lifting the clamped object. The pulling element can be disposed between the second jaw and the jaw support. The pulling element can be freely move in an up direction. In the down direction, the jaw support can block the pulling element. In the horizontal directions toward to/away from the jaw support, the pulling element can be constraint by the second jaw and the jaw support. The pulling element can be constrained in directions parallel to the jaw support, for example, by having a hollow space that the clamp bar can pass through. The hollow space can have an elongated shape along the up/down directions, and a tight fit with the clamp bar in directions parallel to the jaw support. Similar to the support bar that limits the movements of the second jaw, the elongated shape of the hollow space in the pulling element can limit the movements of the pulling element in directions parallel to the jaw support.

The pulling element can be configured to exert a clamping force on the object when being pulled, for example, through a slanting surface of the jaw support. For example, the pulling element can include a set of rollers 1032, which can provide rolling friction with the second jaw and the jaw support. Thus there can be minimum friction when the pulling element is pulled up, pushing the second jaw away from the jaw support due to the slanting surface of the jaw support. The set of rollers can include first rollers contacting the second jaw surface, and second rollers contacting the jaw support surface. There can be recesses at the jaw support at location where the first rollers face the jaw support, so that the first rollers only contact the second jaw and not the jaw support. There can be recesses at the second jaw at location where the second rollers face the second jaw, so that the second rollers only contact the jaw support and not the second jaw.

The clamping device can include a second locking mechanism 1035, which can be coupled to either the clamp bar or to the second jaw assembly to prevent the pulling element from being pulled up. The pulling element can be constrained from going down by the jaw support, thus the second locking mechanism, when engaged, when secure the pulling element to the clamp bar. The pulling element can be locked to a bottommost location, which can provide that the second jaw is closest to the jaw support. The springs can assist in pulling the second jaw toward the jaw support, which can form a largest opening between the two jaws of the clamping device.

In operation, the locking mechanism, e.g., the locking mechanism that locks the second jaw assembly to the clamp bar, can be unlocked, for example, by pulling back the second mated component 1072 to disengage the second mated component 1072 from the first mated component 1071. This will release the second jaw assembly from the clamp bar, and thus the second jaw assembly can slide along the clamp bar so that the distance between the two jaws can be large enough to accommodate the object.

After putting the object within the first and second jaw, the locking mechanism can be engaged, e.g., the second mated component can be pushed up to engage with the first mated component, locking the second jaw assembly to the clamp bar. If the locking mechanism is a discrete locking mechanism, there can be gaps between the object and the jaws.

Next, the second locking mechanism 1035, e.g., the locking mechanism that locks the pulling element to the clamp bar, can be unlocked, so the pulling element can be pulled up. Due to the rollers, the pulling element can easily moved against the second jaw and the jaw support. Since a dimension of the rollers is larger than the distances between the second jaw and the jaw support at upper locations (e.g., at locations above the resting location or the locked location of the pulling element), the moving up action of the pulling bar (and the rollers) can force the second jaw to move away from the jaw support. The springs can be flex, to accommodate the movement of the second jaw away from the jaw support. The second jaw can move away from the jaw support, until the second jaw is in contact with the object. If there is a gap between the object and the first jaw, the second jaw can keep moving to narrow that gap. The second jaw then continue to move until the first and second jaws all contact the object.

In some embodiments, the second jaw can move down, in addition to moving away from the jaw support, due to gravity (FIG. 10D). The springs can bend to accommodate the downward movement of the second jaw. The support bars 1055 can prevent the second jaw from going down too far, e.g., the support bars can stop the second jaw movement when the support bars contact the upper portions of the hollow spaces 1056 of the second jaw.

FIGS. 11-21 illustrate additional views of the clamping device according to some embodiments. A clamping device can include a first jaw assembly and a second jaw assembly disposed in substantially perpendicular with a clamp bar. The clamp bar can include a hollow bar with rectangular cross section, which can be coupled to one end of the first and second jaw assembly. The first jaw assembly can be fixedly coupled to the clamp bar. The second jaw assembly can be movably coupled to the clamp bar, such as moving along the clamp bar. The movable second jaw assembly can be secured to the clamp bar, for example, by a locking mechanism. The locking mechanism can be spring loaded, so that it can always lock the jaw assembly to the clamp bar. Operator action can be required to release the lock to move the jaw assembly.

The clamping device can include a pulling element, which can be coupled to a jaw assembly, such as the fixed first jaw assembly or the movable second jaw assembly. For example, the jaw assembly can include a jaw facing a jaw support. The pulling element can be disposed between the jaw and the jaw support. The pulling element can also be coupled to the clamp bar, e.g., so that the jaw assembly and the pulling element can move as one unit along the clamp bar.

An interface between the pulling element and the jaw assembly can include a slanting surface, which can be configured so that when the pulling element is pulled up, the jaw is moving away from the jaw support if there is no obstacle blocking the movement of the jaw. Alternatively, if an object is already present between the jaws of the clamping device, the slanting surface can convert the action of pulling the pulling element to an action, e.g., a force, pushing on the jaw, to clamp on the object.

Figure 11:
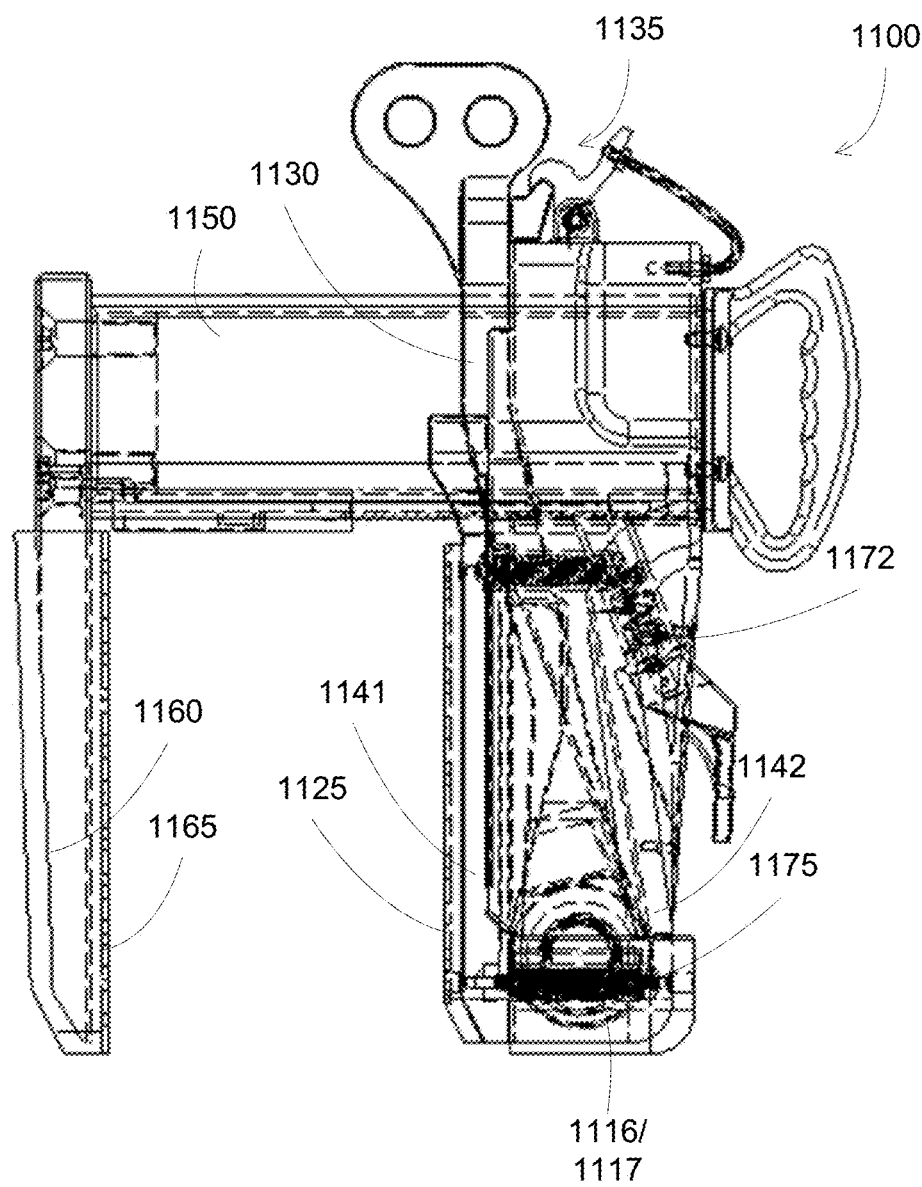
FIG. 11 shows a transparent view of the clamping device.

FIG. 11 shows a transparent view of the clamping device. A clamping device 1100 can include a first jaw 1160 which is fixedly coupled to a clamp bar 1150. A rubber pad 1165 can be coupled to the first jaw to increase friction with clamped objects. A jaw assembly including a second jaw 1141 and a jaw support 1142 can be movably coupled to the clamp bar. A locking mechanism 1172 can be included, to secure the jaw assembly, and as shown, to secure the jaw support, to the clamp bar. A rubber pad 1125 can be coupled to the first jaw to increase friction with clamped objects. Springs 1175 can couple the second jaw with the jaw support. A pulling element 1130 can be disposed between the second jaw and the jaw support, which can have slanting interfaces with the jaw assembly. The pulling element can include rollers 1116 and 1117, which can roll on the slanting surface of the jaw support. A second locking mechanism 1135 can be coupled to the jaw support for securing the pulling element with the jaw support.

Figure 12:
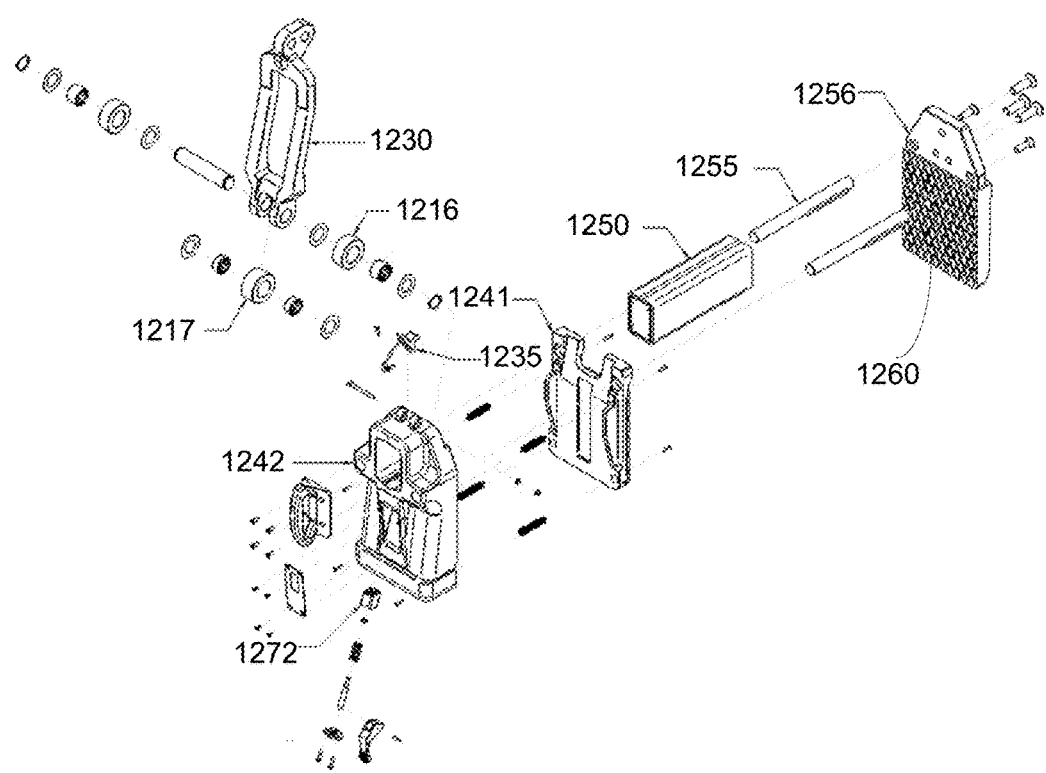
FIG. 12 shows an exploded view of the clamping device.

FIG. 12 shows an exploded view of the clamping device. The components of the clamping device are shown in exploding relationship, including the first jaw 1260, the second jaw 1241, the jaw support 1242, the clamp bar 1250, the pulling element 1230, the locking mechanism 1272, the second locking mechanism 1235, and the rollers 1216 and 1217. In addition, support bars 1255 acting as limiter for the second jaw car shown, together with the hollow spaces 1256 in the second jaw.

FIGS. 13A-13C show different views of a jaw of in jaw assembly in the clamping device. In FIG. 13A, a jaw 1341, such as the second jaw in a jaw assembly of a clamping device, can include hollow spaces 1356, which can allow the support bars to pass through to act as limiters for the jaw 1341, e.g., to limit the movements of the jaw 1341. A recess 1327 at a top portion of the jaw 1341 can allow the clamp bar to pass through. The recess can have the shape of a portion of the shape of the clamp bar, which can be rectangular. FIG. 13B shows a different view of the jaw 1341 of in jaw assembly in the clamping device. In the FIG. 13C, the jaw 1341 can include coupling terminals 1325, which can be used to secure the ends of the springs to the jaw 1341. The jaw 1341 can include a wall surface 1321, which can allow rollers of a pulling element to roll on. The jaw 1341 can include a recess 1323 on a portion of the wall surface 1321, which can prevent other rollers of the pulling element from contacting the jaw 1341. The other rollers can be configured to roll on surface of a jaw support, and not contacting surfaces of the jaw.

FIGS. 14A-14C show different views of a jaw support portion of a jaw assembly in the clamping device. In FIG. 14A, a jaw support 1442, such as the jaw support in a jaw assembly of a clamping device, can include a hollow space 1428, which has the same shape and size as a clamp bar, to allow the clamp bar to pass through. Further, there can be a tight fit of the hollow space with the clamp bar, so that the jaw support can move along the clamp bar without moving in directions perpendicular to the moving directions.

The jaw support 1442 can include hollow spaces 1457, which can allow the passing the support bars, which act as limiters for the corresponding jaw in the jaw assembly. The hollow spaces 1457 can allow the jaw support to move along the support bars.

The jaw support 1442 can include coupling terminals 1426, which can be used to secure the ends of the springs to the jaw support 1442, e.g., the other ends of the springs can be secured to the coupling terminals of the jaw (FIG. 14A and FIG. 14C).

The jaw support can include an opening 1411 for the installation of a clocking mechanism. The opening can be used to install a mating component to a cyclic pattern bar, which is fixedly coupled to the clamp bar (FIG. 14B).

The jaw support can include a hollow cavity 1412 (FIG. 14B), which can be used to house the pulling element. The jaw support can include a slanting surface 1424, on which the rollers of the pulling element can roll on, for moving relative to the jaw support, and for pushing the jaw toward the object. Near the slanting surface 1424 is recesses 1422, which can be used to prevent the other rollers of the pulling element from contacting the jaw support.

Figure 15A:
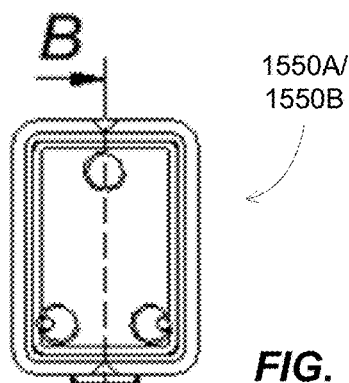
FIGS. 15A-15C show different views of different configurations for a clamp bar portion of a jaw assembly in the clamping device.
Figure 15B:
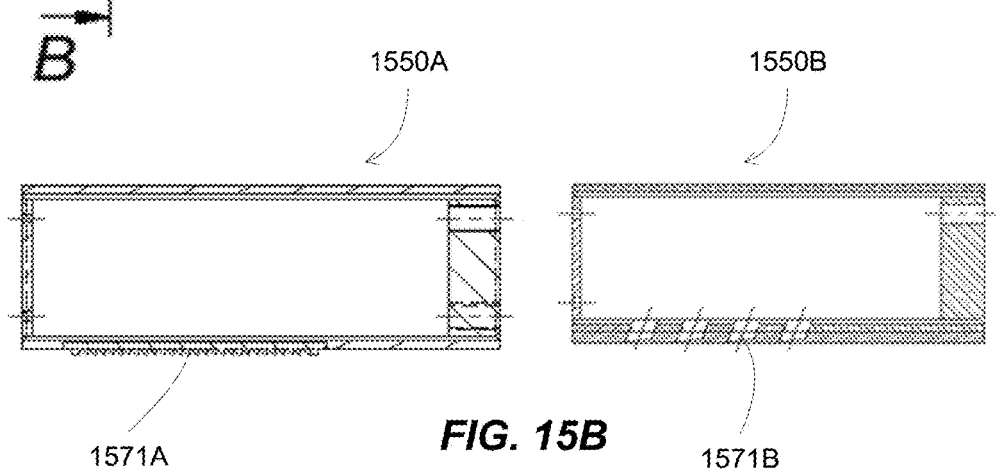
Figure 15C:
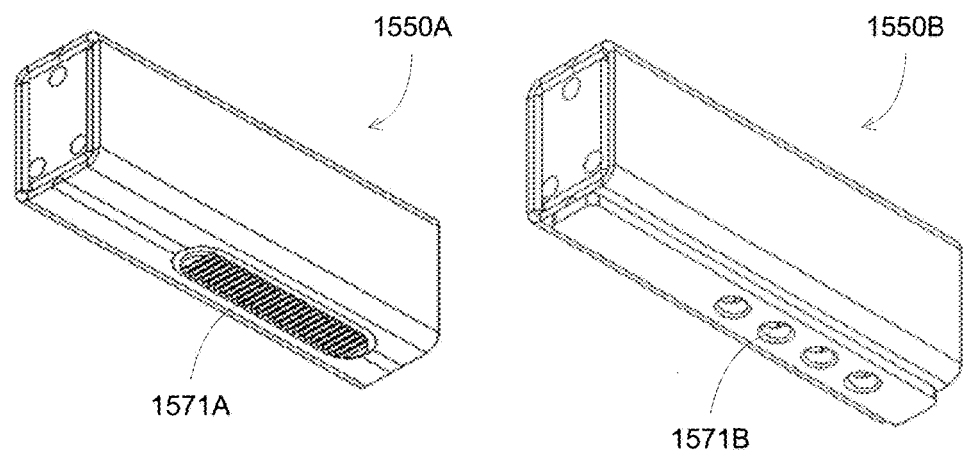

FIGS. 15A-15C show different views of different configurations for a clamp bar portion of a jaw assembly in the clamping device. FIG. 15A shows a side view of clamp bars 1550A and 1550B, with cross section BB. FIG. 15B shows cross sections BB of clamp bar 1550A and 1550B, showing cyclic pattern bars 1571A and 1571B. The cyclic pattern bar 1571A can be a rack bar (or a cog bar, with protruded teeth). The cyclic pattern bar 1571B can include multiple holes. FIG. 15C show perspective views of the clamp bars 1550A and 1550B. The clamp bar can have a rectangular cross section. The clamp bar can include a hollow bar, for example, to reduce the weight of the clamp device.

FIGS. 16A-16C show different views of a pulling element portion of a jaw assembly in the clamping device. The pulling element 1630 can include a connector 1613 for coupling to a hoist, such as a hook or one or two holes for accepting a hook terminal from a hoist. Thus the pulling element can be pulled up by the hoist. Since the pulling element is coupled to the clamping device, the hoist then can pull up the clamping device. Since the clamping device clamps on the object, the hoist then can pull up and then transfer the object.

The pulling element can include a hollow space 1615 (FIG. 16A and FIG. 16C), which can be configured for the clamp bar to pass through. Thus the pulling element can be coupled to the clamp bar, and in turn, coupled to the clamp device. The hollow space 1615 can be larger in a vertical direction, e.g., in the direction of gravity or the up/down directions, e.g., larger than a cross section of the clamp bar. Thus the pulling element can move in the up and down directions. The hollow space can be used as a limiter, to limit the up/down movements of the pulling element. For example, the top end of the hollow space can limit the pulling element from going downward, after the pulling element contacts the clamp bar. In this position, the pulling element can be secured to the jaw support, through a locking mechanism that includes a locking component 1614, such as a hook. A mating latch can be disposed in the jaw support, thus when the mating latch locks onto the hook 1614, the pulling element can be constrained from moving upward.

The hollow space can be configured to have a tight fit in a horizontal direction with the clamp bar, which can prevent the pulling element from moving in a horizontal direction. In another horizontal direction, e.g., directions along the clamp bar, the pulling element can move, but because the pulling element is disposed between the jaw and the jaw support of a jaw assembly, the pulling element is constrained and can only move when the jaw assembly moves. Thus the pulling element can be coupled to the clamp bar in such a way as to be able to move up and down, but not sideway.

The pulling element can include a set of rollers 1616 and 1617 (FIG. 16A and FIG. 16C). The rollers 1616 can be configured to roll on surfaces of the jaw support. The rollers 1617 can be configured to roll on surfaces of a jaw, which is facing the jaw support and which, in combination with the jaw support, forms a jaw assembly.

In some embodiments, the rollers are concentric, e.g., aligned in a horizontal line, and have a same dimension, e.g., diameter. The surfaces of the jaw facing the rolled surface of the jaw support can be recessed, so that the rollers 1616 can roll on the jaw support surface in the gap between the jaw and the jaw support. The surfaces of the jaw support facing the rolled surface of the jaw can be recessed, so that the rollers 1617 can roll on the jaw surface in the gap between the jaw and the jaw support.

The pulling element is configured to form a slanting interface with the jaw assembly, e.g., with at least one of the jaw and the jaw support. In some embodiments, a slanting interface can be formed by having a triangle shape in a gap between the jaw and the jaw support, together with the pulling element having a triangle shape when view from a horizontal direction parallel to the gap (FIG. 16B). Thus the pulling element can have a small top portion 1631, e.g., a small handle at the top and middle portion of the pulling element. The pulling element can have a larger bottom portion 1632, which can be achieve by having a larger bottom portion of the pulling element, together with larger diameter rollers.

Since the diameters of the rollers are larger than the middle portion 1631, when the pulling element moves up, the rollers can enlarge the gap, e.g., the separation between the jaw and the jaw support, or can exert a force on the jaw away from the jaw support, if the jaw is constrained from moving.

Figure 17A:
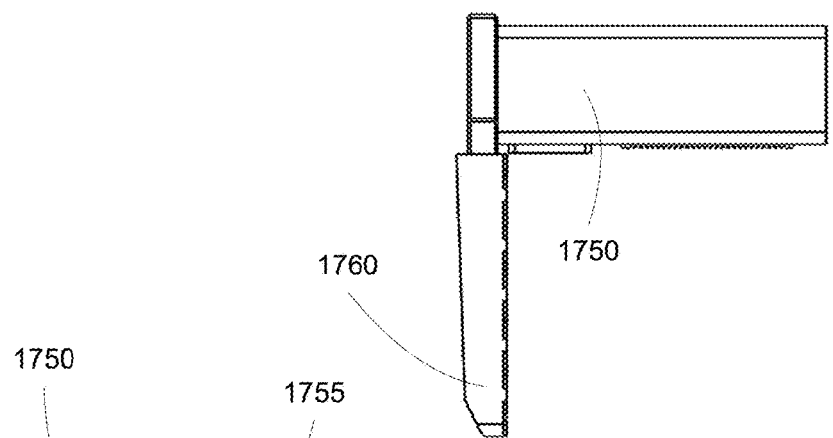
FIGS. 17A-17C show configurations for a jaw coupling to a clamp bar in the clamping device.
Figure 17B:
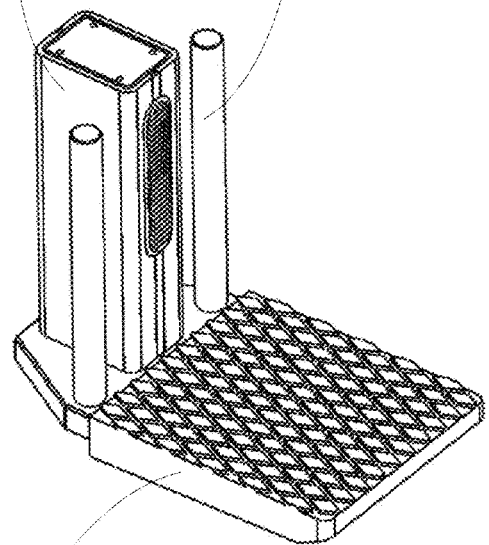
Figure 17C:
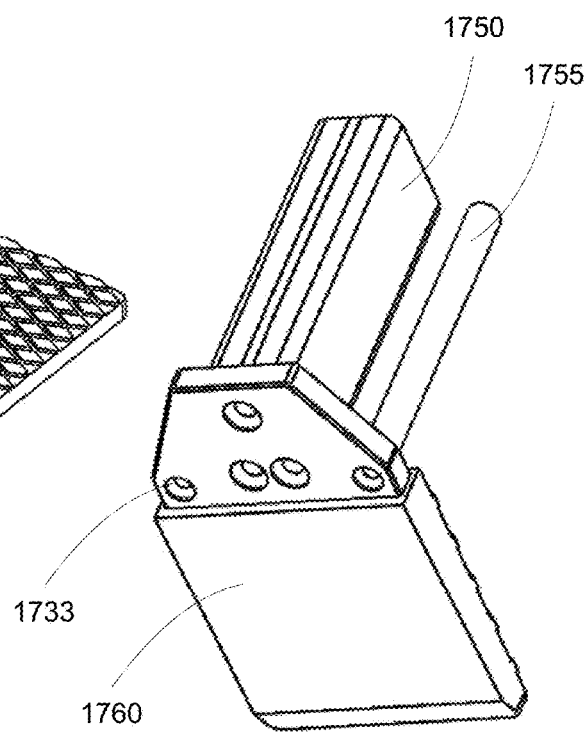

FIGS. 17A-17C show configurations for a jaw coupling to a clamp bar in the clamping device. A jaw, such as a first jaw 1760, can be fixedly coupled to a clamp bar 1750 (FIG. 17A), for example, through screw holes 1733 (FIG. 17C). The jaw and the clamp bar can form a right angle. Support bars 1755 can be fixedly coupled to the jaw 1760 (FIG. 17B). The support bar can be used as limiters for a second jaw, which is disposed in opposite of the first jaw 1760. A jaw assembly can slide along the clamp bar, and the support bars.

FIGS. 18A-18D show configurations for a jaw coupling to a limiter in the clamping device. A jaw 1841 (FIG. 18A, FIG. 18B, FIG. 18C and FIG. 18D), such as a second jaw (e.g., in addition to the first jaw fixedly coupled to the clamp bar), can be coupled to a jaw support. The jaw support is then coupled to the clamp bar.

Figure 18A:
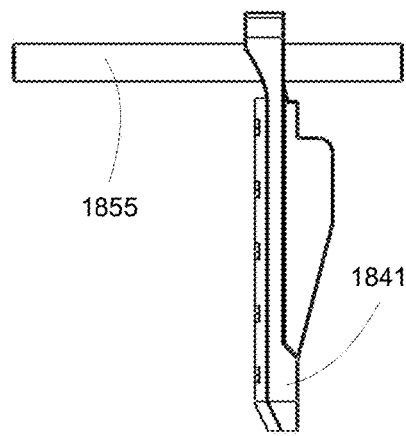
FIGS. 18A-18D show configurations for a jaw coupling to a limiter in the clamping device.
Figure 18B:
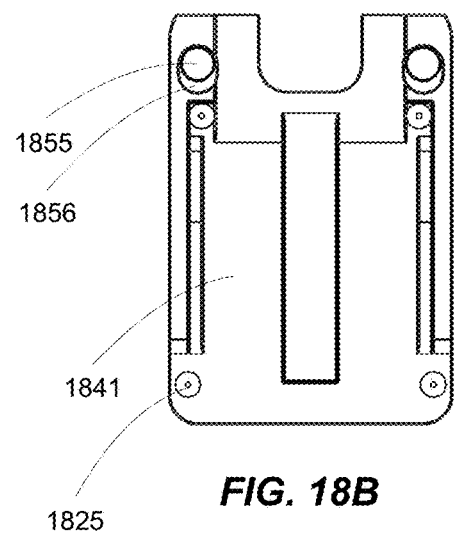
Figure 18C:
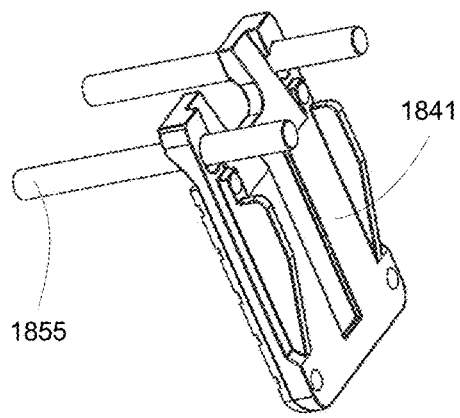
Figure 18D:
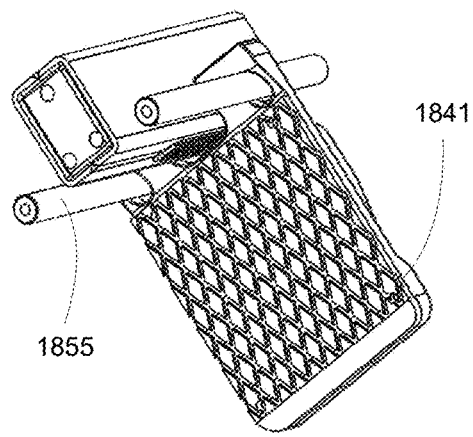

The second jaw can be coupled to the support bars, e.g., loosely coupled as to be able to move in limited distances. For example, the second jaw can include through holes 1856, which is larger than the cross section of the support bars 1855 (FIG. 18A, FIG. 18B, FIG. 18C and FIG. 18D). As shown, the second jaw can move up a small distance, and can have a much more restricted movement in the horizontal direction, due to the shape of the through holes 1856 as compared to the support bars 1855 (FIG. 18B).

In the FIG. 18B, the second jaw can include connector terminals 1825, such as recesses in the second jaw, for coupling with flexible elements such as springs, to couple the second jaw with the jaw support.

FIGS. 19A-19D show configurations for a jaw support coupling to a clamp bar in the clamping device. The jaw support 1942 can have a hollow space with tight fit to the clamp bar 1950, so that the jaw support can move in directions along the clamp bar, but is restricted or constrained in other directions, such as up/down or sideway, e.g., perpendicular to the directions along the clamp bar (FIG. 19A, FIG. 19B, FIG. 19C and FIG. 19D). The jaw support can also have hollow spaces for the support bars 1955 to pass through with tight fit (FIG. 19D).

The jaw support can include a cavity 1911 for housing components of a locking mechanism for securing the jaw support with the clamp bar (FIG. 19B). The jaw support can include a mounting component 1918 for housing components of a second locking mechanism for securing the pulling element with the jaw support.

Figure 20A:
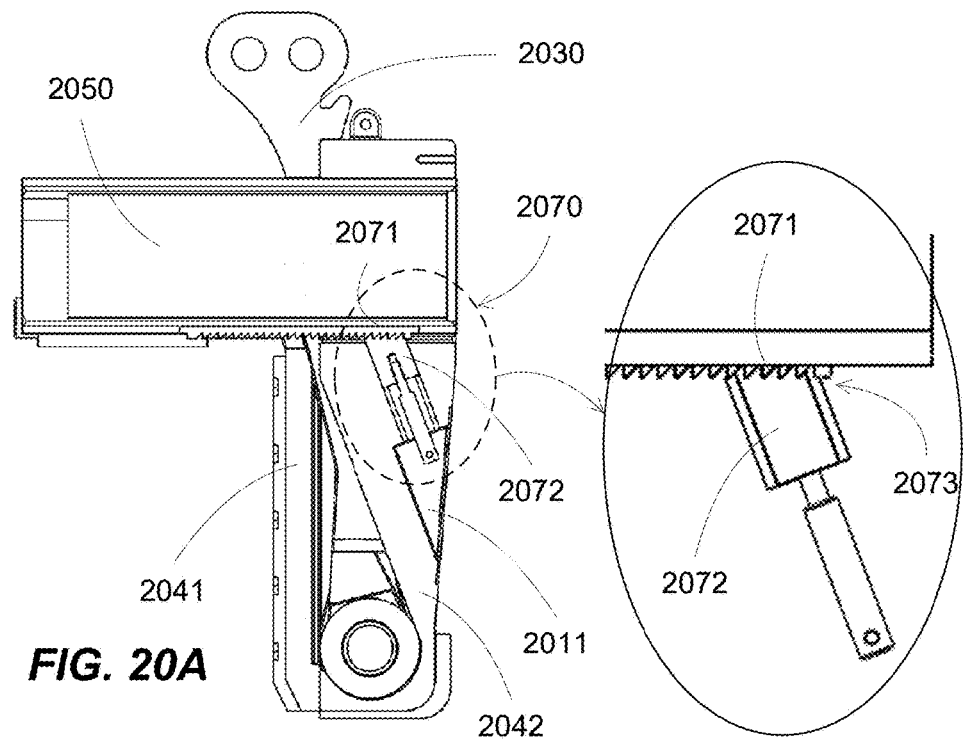
FIGS. 20A-20B show configurations for a locking mechanism to secure a jaw support to a clamp bar in the clamping device.
Figure 20B:
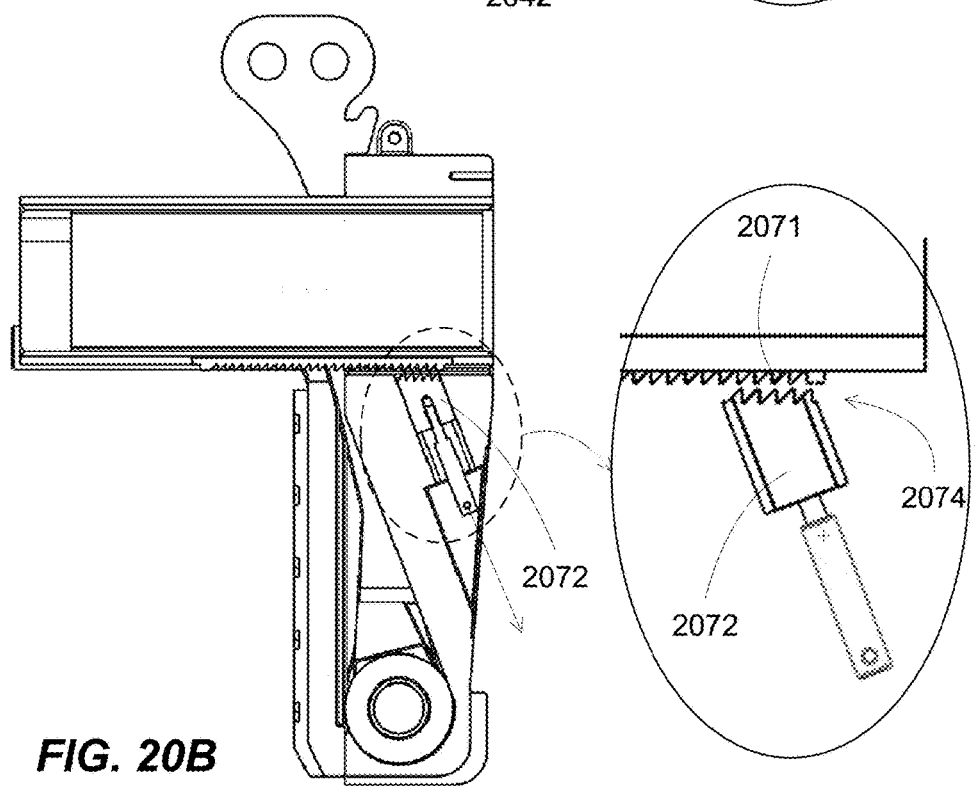

FIGS. 20A-20B show configurations for a locking mechanism to secure a jaw support to a clamp bar in the clamping device. A jaw assembly can include a jaw 2041 and a jaw support 2042. A pulling element 2030 can be disposed between the jaw and the jaw support. A clamp bar 2050 can pass through the jaw assembly and the pulling element, thus can allow the jaw assembly and the pulling element to move along the clamp bar.

A locking mechanism 2070 can be used to secure the jaw support to the clamp bar. The locking mechanism 2070 can include a cyclic pattern bar 2071 coupled to the clamp bar. As shown, the cyclic pattern bar 2071 includes a cog bar, which has multiple protruded gear teeth. The gear teeth can be asymmetric, such as having a triangle shape tilted toward the opposite jaw. In that way, it can be easier to move the jaw support toward the jaw than to move the jaw support away from the jaw. Other cyclic pattern bars can be used, such as a number of holes.

The locking mechanism 2070 can include a mated pattern component 2072, which can have a top portion mated with the cyclic pattern bar. The mated pattern component can be housed in a cavity 2011 in the jaw support. The mated pattern component can be engaged or disengaged from the cyclic pattern bar, locking to or unlocking the jaw support from the clamp bar, respectively.

FIG. 20A shows an engagement configuration 2073 of the locking mechanism, in which the mated pattern component 2072 is pushed toward the clamp bar to contact the cog bar 2071. FIG. 20B shows a disengagement configuration 2074 of the locking mechanism, in which the mated pattern component 2072 is pushed backward away from the clamp bar, e.g., from the cog bar 2071. The jaw support then can be free to move along the clamp bar.

Figure 21A:
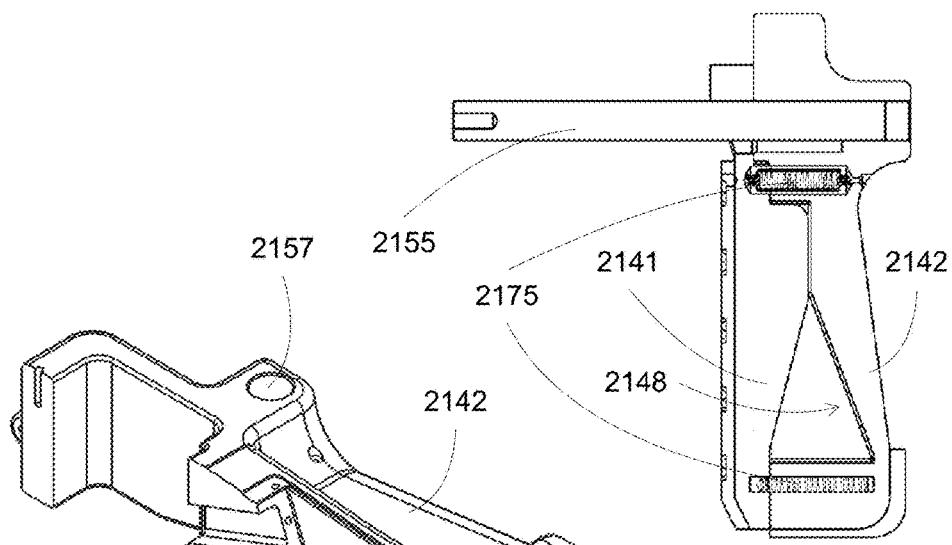
FIGS. 21A-21C show configurations for a jaw coupling to a jaw support in the clamping device.
Figure 21B:
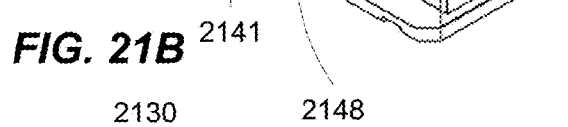
Figure 21C:
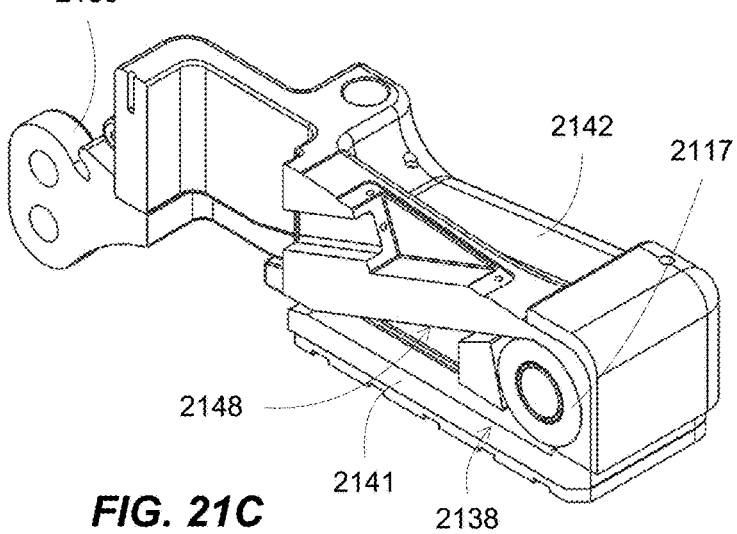

FIGS. 21A-21C show configurations for a jaw coupling to a jaw support in the clamping device. A jaw 2141 can be coupled to a jaw support 2142 in a way that can allow the jaw to move relative to the jaw support. Support bars 2155 can be used to pass through both the jaw and the jaw support (FIG. 21A). The support bars can make a tight fit with the jaw support, e.g., passing the jaw support at through holes 2157 with about the same dimension as the cross section of the support bars, so as allow the jaw support to move along the support bars without any sideward movements (FIG. 21B). The support bars can make a loose fit with the jaw, so as allow the jaw support to move along the support bars together with limited sideward movements.

Springs 2175 can also be used to couple the jaw to the jaw support. The springs can be fixed at one end to the jaw, and the opposite end to the jaw support. The springs can be configured so that there is a small force pulling the jaw to the jaw support, e.g., enough to allow the jaw to contact the jaw support and to prevent the jaw, when at rest, from leaving the jaw support.

The jaw support can include a slanting surface 2148, which is tapered toward the jaw in the direction toward the clamp bar, e.g., the jaw and the jaw support can form a cavity in the shape of a triangle, with the bottom portion larger than the top portion.

Couple with a pulling element 2130 having rollers 2117, the slanting surface 2148 can allow the jaw to separate from the jaw support when the pulling element is pulled up, e.g., the rollers 2117 is rolled toward the clamp bar direction. The jaw can have a recess 2138, so that when the rollers 2117 roll on the slanting surface 2148 of the jaw support, the rollers do not contact the surface of the jaw (FIG. 21C).

Figure 22A:
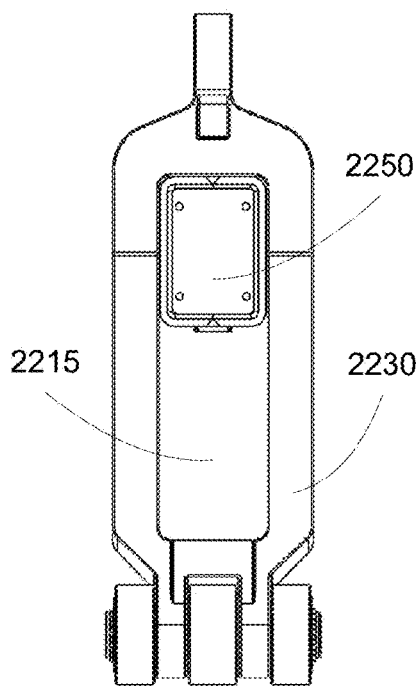
FIGS. 22A-22C show configurations for a pulling element to a clamp bar in the clamping device.
Figure 22B:
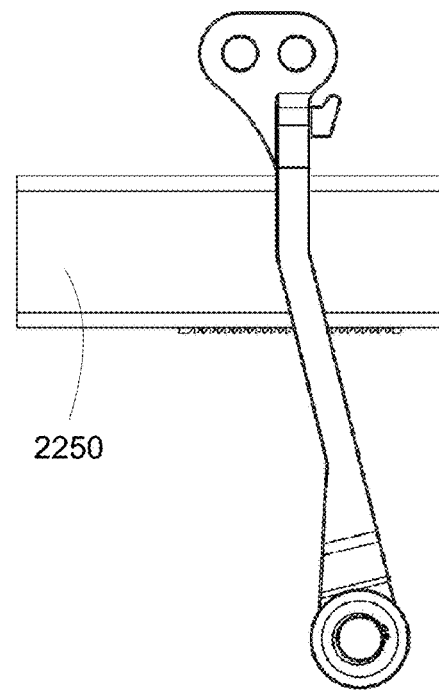
Figure 22C:
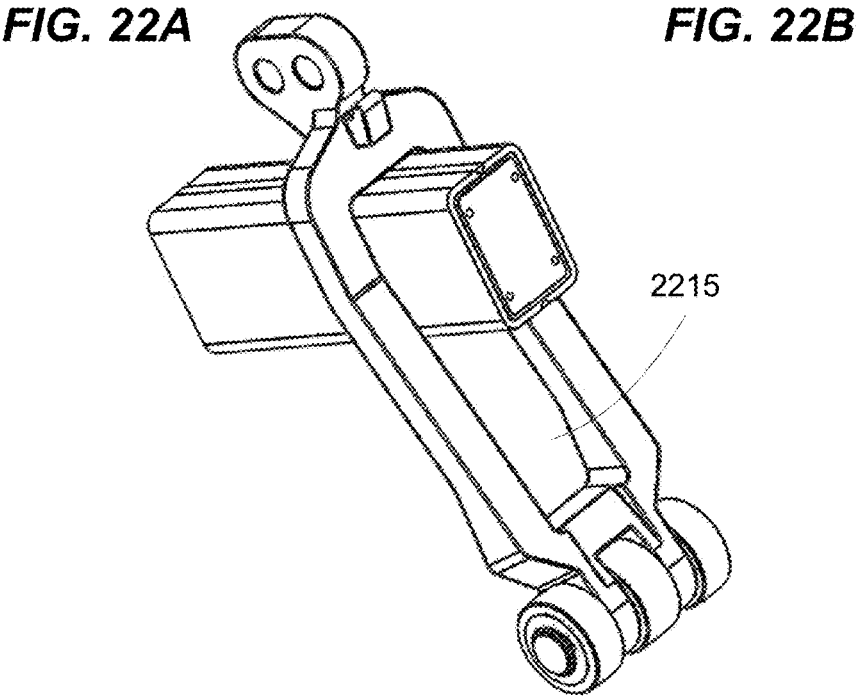

FIGS. 22A-22C show configurations for a pulling element to a clamp bar in the clamping device. A pulling element 2230 (FIG. 22A) can be coupled to a clamp bar 2250 (FIG. 22B) in such a way as to allow the pulling element to move up and down but not sideway. For example, the clamp bar can have a rectangular cross section. And the pulling element can have a hollow space 2215 (FIG. 22C) with a corresponding rectangular shape. The up/down dimensions of the hollow space can be larger than the clamp bar cross section, thus can allow the pulling element to move up or down with respect to the clamp bar. The sideward dimensions of the hollow space, e.g., the horizontal dimensions of the hollow space 2215 in FIG. 22A, can be similar to the clamp bar cross section, thus can allow the pulling element to move up and down but not sideway.

FIGS. 23A-23D show configurations for a locking mechanism to secure a jaw support to a clamp bar in the clamping device. In addition to a locking mechanism used to secure the jaw support to the clamp bar, a second locking mechanism 2335 can be included to secure the pulling element 2330 to the jaw support 2342. The second locking mechanism can lock the pulling element to a downward most position, e.g., a position that minimizes the gap distance between the jaw and the jaw support, or a position that makes the jaw closest to the jaw support. Together with the springs pulling on the jaw toward the jaw support, the second locking mechanism can keep the jaw of the jaw assembly away from the opposite jaw in the clamping device, e.g., making sure that the opening between the jaws of the clamping device is largest possible so that it can be easier to put the object into the jaws.

The second locking mechanism can include a latch 2334, which can be rotated around a center or rotation 2318 on the jaw support. Rotating forward in one direction, such as counterclockwise as in FIG. 23A or 23C, the latch can engage with a hook 2314 in the pulling element, preventing the pulling element from moving upward. Rotating backward, such as clockwise as in FIG. 23B or 23D, the latch can disengage from the hook 2314, allowing the pulling element to move upward.

The latch can be configured for automatic lock, e.g., from the unlocked or disengaged position, the pulling element can be pushed down, and the hook 2314 can push on a level of the latch 2334, swinging the latch counterclockwise to lock or engage with the hook. A spring can be included, to keep the latch in engaged position. The pulling element, when pushed down, can swing the latch clockwise to open the latch. When the pulling element is at the lowest position, the latch can swing back to lock with the hook.

FIGS. 24A-24B illustrate flow charts for forming a clamping device according to some embodiments. In FIG. 24A, operation 2400 forms a clamping device, wherein the clamping device comprises a first jaw coupled to a clamp bar, and a jaw assembly coupled to the clamp bar, wherein the jaw assembly comprises a second jaw disposed opposite the first jaw for clamping on an object, wherein the jaw assembly comprises a jaw support, wherein the jaw assembly comprises a pulling element disposed between the second jaw and the jaw support, wherein at least an interface between the pulling element and the jaw support and an interface between the pulling element and the second jaw comprises a slanting surface, wherein the slanting surface is configured so that when the clamping device is lifted up from the pulling element, the second jaw is configured to press on the object.

In FIG. 24B, operation 2420 forms a clamping device, wherein the clamping device comprises a clamp bar, a first jaw, and a jaw assembly, wherein the jaw assembly comprises a jaw support, wherein at least one of the first jar or the jaw support is configured to movably couple to the clamp bar and to lockably coupled to the clamp bar at discrete positions through a locking mechanism, wherein the jaw assembly comprises a second jaw disposed opposite the first jaw for clamping on an object, wherein the second jaw is coupled to the jaw support through a flexible component to allow the second jaw to move in multiple directions with respect to the jaw support, wherein the jaw assembly comprises a pulling element disposed between the second jaw and the jaw support, wherein at least an interface between the pulling element and the jaw support and an interface between the pulling element and the second jaw comprises a slanting surface, wherein the slanting surface interface comprises a rolling friction, wherein the slanting surface is configured so that when the pulling element moves in a direction comprising a vertical direction, the second jaw moves away relative to the jaw support in a direction comprising a horizontal direction.

Figure 25A:
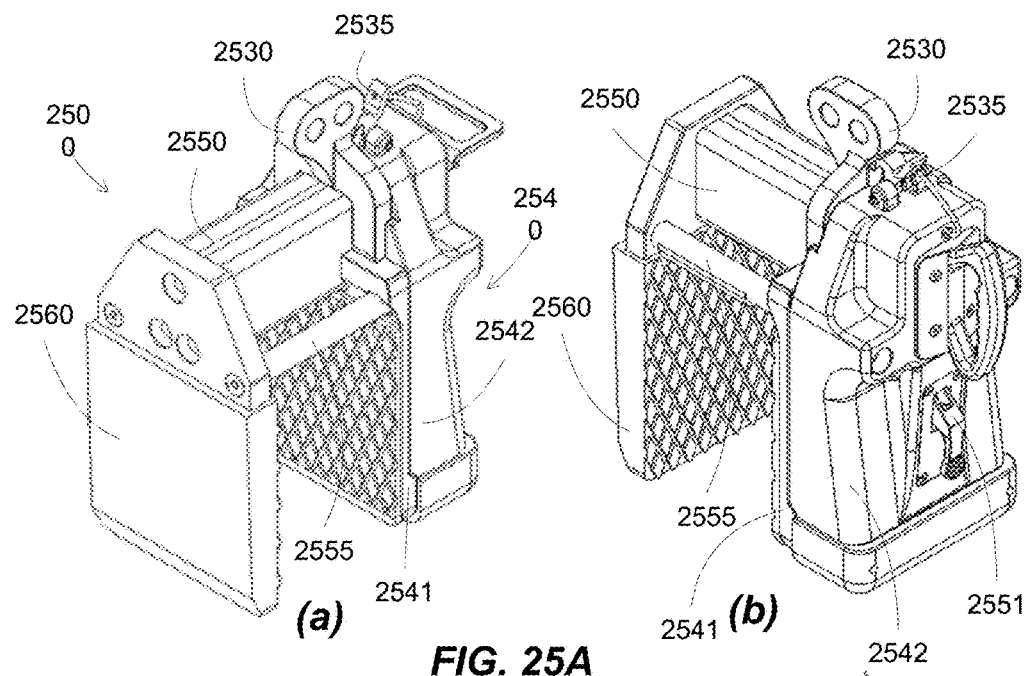
FIGS. 25A (a)-(b) and 25B (a)-(c) illustrate an operation of a clamping device according to some embodiments.

FIGS. 25A (a)-(b) and 25B (a)-(c) illustrate an operation of a clamping device according to some embodiments. FIG. 25A (a)-(b) show perspective views of a clamping device 2500 configured for lifting heavy objects. The clamping device can include a first jaw 2560 fixedly coupled to a clamp bar 2550. The clamping device can include a second jaw assembly 2540, which can be movably and lockably coupled to the clamp bar. The second jaw assembly can include a second jaw 2541 disposed opposite the first jaw. The second jaw assembly can include a jaw support 2542, which can slide along the clamp bar for movably coupled to the clamp bar. The second jaw assembly can include a discrete locking mechanism 2551 for locking to the clamp bar. The second jaw assembly can include stretchable elements, such as springs (not shown), which can be coupled to the second jaw and the jaw support, for pulling the second jaw toward the jaw support. The stretchable elements can allow the second jaw to move away from the jaw support, for a limited distance, such as a distance equal or smaller than a distance between the discrete locking locations of the discrete locking mechanism.

End point limits 2555 can be included to prevent the second jaw from moving too far from the jaw support, such as support bars 2555 fixedly coupled to the first jaw, passing through the second jaw with large openings, and stopping after passing the jaw support.

The clamping device can include a pulling element 2530, which can be configured to be pulled on for lifting the clamped object. The pulling element can be freely move in an up direction. The pulling element can be configured to exert a clamping force on the object when being pulled, for example, through slanting surfaces of the components of the second jaw assembly, such as a slanting interface between the pulling element and the jaw support.

A second locking mechanism 2535 can be coupled to either the clamp bar or to the second jaw assembly to prevent the pulling element from being pulled up.

Figure 25B:
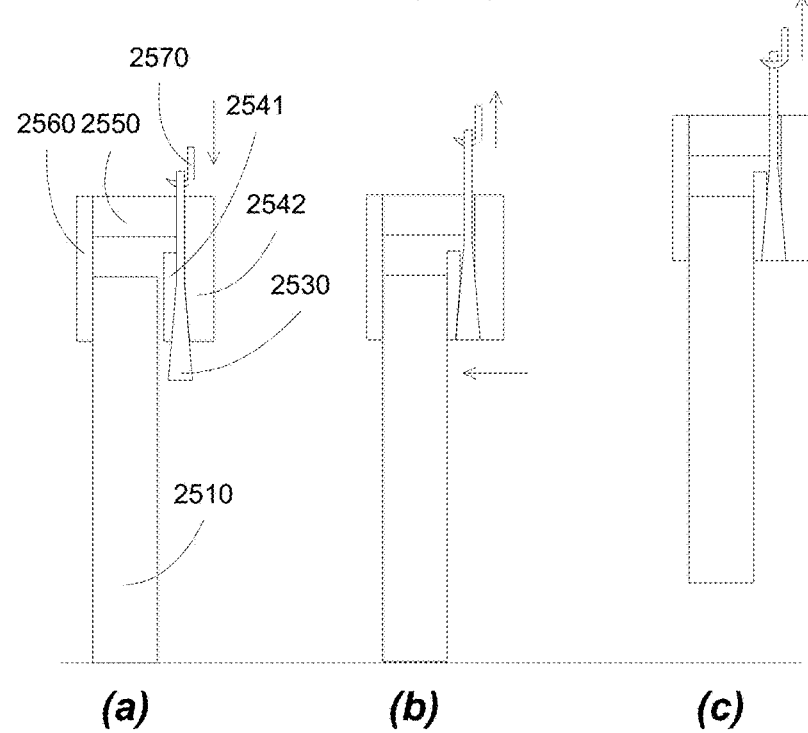

FIG. 25B (a)-(c) show an operation of the clamping device. In FIG. 25B (a), the pulling element 2530 can be in a down most position, and locked by the second locking mechanism. Due to the stretchable elements, the second jaw 2541 can be pulled toward the jaw support 2542.

The first locking mechanism can be disengaged, and the second jaw assembly can be moving along the clamp bar, to enlarge a distance between the first jaw 2560 and the second jaw 2541 for accommodating an object 2510. The object can be placed between the two jaws of the clamping device. The second jaw assembly then can be pushed back, e.g., moving toward the first jaw to narrow the gaps between the object and the jaws. When the total gaps between the object and the jaws are at a minimum, the second jaw assembly can be locked to the clamp bar, for example, by engaging the first locking mechanism.

In FIG. 25B (b), the pulling element can be pulled up, for example, by a hoist 2570 hooking to the pulling element. The pulling on the pulling element can push the second jaw toward the object for clamping the object. In FIG. 25B (c), further pulling on the pulling element can lift the object above the ground to move to a new location.

FIGS. 26A-26E illustrate detailed operations of a clamping device according to some embodiments. In FIG. 26A, the locking mechanism can be unlocked 2670, for example, by pulling back the pattern component 2622 to disengage the pattern component from the cyclic pattern bar 2621. This will release the second jaw assembly from the clamp bar, and thus the second jaw assembly (the second jaw 2641, the jaw support 2642, together with the pulling element 2630) can slide 2671 along the clamp bar away from the first jaw 2660 so that the distance between the first jaw and the second jaw can be large enough to accommodate the object 2610. The object is then can be placed 2672 between the two jaws of the clamping device 2600.

In FIG. 26B, the second jaw assembly is then moved 2674 toward the object, so that the total gaps 2675 between the object and the two jaws are minimum. For example, the second jaw assembly can move 2674 so that the object is in contact with the two jaw. Then the second jaw assembly can be slowly pulled back in an opposite direction to a position that the pattern component can engage 2676 with the cyclic pattern bar. The pattern component then can be pushed up to engage with the cyclic pattern bar, locking the second jaw assembly to the clamp bar.

In FIG. 26C, the second locking mechanism can be unlocked 2678, to free the pulling element, so the pulling element can be pulled up. For example, a latch can be released from its hold on the pulling element.

In FIGS. 26D and 26E, the pulling element can pull up 2680. The pulling action can be easily accomplished due to the rollers 2631 facing the second jaw and the jaw support. Due to the rollers, the pulling element can easily roll 2683 on the surfaces of the second jaw and the jaw support. The second jaw can move away 2681 from the jaw support, due to the movement of the pulling element. The springs 2643 can be bend and flex, to accommodate the movement of the second jaw. The support bar 2644 can prevent 2684 the second jaw from going down too far.

Since the second jaw is freely coupled to the jaw support, it can move, especially in response to the pulling motion of the pulling element. The movement 2681 of the second jaw can include two components. A downward component due to gravity. And a sideway component away from the jaw support, due to the movement of the pulling element. The motion limiter (support bar 2644) can limit the downward movement of the second jaw. Thus the second jaw can move down until stopped by the support bar. The springs 2643 can assist in limiting the movements of the second jaw, such as stretching and flexing downward.

The sideway component can be restrained by the object, meaning the second jaw can move away from the jaw support until the second jaw contacts the object. The second jaw can then push 2682 the object toward the first jaw until the object contacts 2685 the first jaw and the second jaw. Thus there is no gaps 2686 between the object and the two jaws.

Further pulling movement 2687 on the pulling element can lift the object.

FIGS. 27A-27B illustrate flow charts for operating a clamping device according to some embodiments. In FIG. 27A, operation 2700 places an object between two jaws of a clamping device. Operation 2710 lifts a component of the clamping device, wherein the component is configured to exert a side force through a slanting surface to one of the two jaws for clamping on the object.

In FIG. 27B, operation 2730 places an object between a fixed first jaw and a movable jaw assembly of a clamping device.

Operation 2740 locks the jaw assembly at a position among multiple positions to achieve a minimum gap between the object and the first jaw and the jaw assembly.

Operation 2750 lifts a component of the clamping device, wherein the component is configured to move a second jaw of the jaw assembly toward the object through a slanting surface to narrow the gap.

Operation 2760 lifts the component, wherein the component is configured to exert a side force through the slanting surface to the second jaw for clamping on the object.

In some embodiments, other configurations for a clamping device can be used, which can include a first jaw assembly and a second jaw assembly coupled to a clamp bar. For example, a pulling element can be disposed between the jaw and the jaw support of a jaw assembly that is fixedly coupled to the clamp bar, e.g., the jaw can be flexibly coupled to the jaw support while the jaw support is fixedly coupled to the clamp bar. The other jaw assembly can be movably coupled to the clamp bar. The other jaw assembly can include only a jaw, which is movably coupled to the clamp bar together with a locking mechanism to lock the jaw to the clamp bar. The other jaw assembly can include a jaw and a jaw support, with the jaw flexibly coupled to the jaw support and the jaw support movably coupled to the clamp bar together with a locking mechanism to lock the jaw support to the clamp bar.

In some embodiments, there can be two pulling elements, one for each jaw assembly.

What is claimed is:

1. A clamping device comprising
a clamp bar;
a first jaw assembly fixedly coupled to the clamp bar, wherein the first jaw assembly comprises a first jaw;
a second jaw assembly movably coupled to the clamp bar through a jaw
support of the second jaw assembly,
wherein the jaw support is configured for sliding along the clamp bar,
wherein the jaw support is securable to the clamp bar, wherein the second jaw assembly comprises a second jaw,
wherein the second jaw is flexibly coupled to the jaw support,
wherein the first jaw and the second jaw are configured for clamping on an object,
a pulling element interfaced with the jaw support,
wherein the interface between the pulling element and the jaw support comprises a slanting interface,
wherein the slanting interface is configured so that when a force is applied to the pulling element in a direction comprising a vertical direction, a second force is generated pushing the second jaw in a direction comprising a direction from the second jaw to the first jaw.

2. A clamping device as in claim 1
wherein the jaw support is configured to be secured to the clamp bar at discrete locations through a locking mechanism
wherein one end of the pulling element comprises rollers, wherein one or more first rollers of the rollers are configured to roll on the slanting surface, wherein one or more second rollers of the rollers are configured to roll on a surface of the second jaw.

3. A clamping device as in claim 1 further comprising
a locking mechanism, wherein the locking mechanism is configured to secure the jaw support to the clamp bar at discrete locations.

4. A clamping device as in claim 1
wherein the jaw support is configured to be secured to the clamp bar at discrete locations,
wherein the second jaw is flexibly coupled to the jaw support so that the second jaw is coupled to the jaw support but is able to move away from the jaw support at a distance greater than a distance between two adjacent locations of the discrete locations.

5. A clamping device as in claim 1 further comprising
a limiting element coupling the second jaw to the jaw support or to the clamp bar, wherein the limiting element is configured to limit a sliding movement of the second jaw with respect to the jaw support.

6. A clamping device comprising
a clamp bar comprising a first end portion;
a first jaw fixedly coupled to the first end portion;
a jaw assembly,
wherein the jaw assembly comprises a jaw support,
wherein the jaw support is configured to be movable along the clamp bar,
wherein the jaw support is configured to be secured to the clamp bar at discrete locations,
wherein the jaw assembly comprises a second jaw,
wherein the second jaw is flexibly coupled to the jaw support so that the second jaw is coupled to the jaw support but is able to move away from the jaw support at a distance at least equal to a distance between two adjacent locations of the discrete locations,
wherein a first surface of the jaw support and a second surface of the second jaw are configured to face each other to form a cavity,
wherein the cavity comprises a dimension between the second jaw and the jaw support that is larger at a location farther from the clamp bar than at a location nearer the clamp bar,
a limiting element coupling the second jaw to the jaw support or to the clamp bar or to the first jaw, wherein the limiting element is configured to allow limited sliding movements of the second jaw with respect to the jaw support;
a pulling element,
wherein the pulling element is disposed in the cavity formed between the second jaw and the jaw support, wherein one end of the pulling element comprises rollers, wherein one or more first rollers of the rollers are configured to roll on the first surface, wherein one or more second rollers of the rollers are configured to roll on the second surface, wherein a diameter of the rollers is larger than a dimension of a portion of the pulling element nearer the clamp bar.

7. A clamping device as in claim 6
wherein the jaw support comprises a hollow space configured to move along the clamp bar.

8. A clamping device as in claim 6 further comprising
a locking mechanism, wherein the locking mechanism comprises a pin configured to be mated to one of multiple holes in the clamp bar.

9. A clamping device as in claim 6 further comprising
a locking mechanism, wherein the locking mechanism comprises a shaft having a pattern at one end, wherein the patterned shaft is configured to be mated to one of multiple locations in a cyclic pattern bar in the clamp bar.

10. A clamping device as in claim 6 further comprising
a locking mechanism, wherein the locking mechanism comprises a shaft having a cog pattern at one end, wherein the cog pattern is configured to be mated to a cog bar in the clamp bar.

11. A clamping device as in claim 6
wherein the second jaw is coupled to the jaw support through one or more springs, wherein the one or more springs are distributed at a periphery of the second jaw.

12. A clamping device as in claim 6
wherein the second jaw is coupled to the jaw support through one or more springs, wherein the strength of the one or more springs is configured to secure the second jaw to the jaw support when the pulling element is not moving, and wherein the strength of the one or more springs is configured to allow the second jaw to move relative to the jaw support when the pulling element is moving in a direction comprising a vertical direction.

13. A clamping device as in claim 6 further comprising
one or more bars coupled to the jaw support or to the clamp bar, wherein the one or more bars pass through the second jaw at an opening larger than the cross section of the one or more bars to support the second jaw and to limit a sliding movement of the second jaw with respect to the jaw support.

14. A clamping device as in claim 6
wherein the pulling element disposed in the cavity is configured so that when the pulling element moves up, the second jaw is configured to move away from the jaw support if there is no blockage.

15. A clamping device as in claim 6
wherein the jaw support is thicker at a portion nearer from the clamp bar as compared to a portion farther away the clamp bar.

16. A clamping device as in claim 6
wherein the pulling element comprises a hollow space configured for the clamp bar to pass through, wherein the hollow space is larger than a cross section of the clamp bar to allow the pulling element to move in a vertical direction with relative to the clamp bar.

17. A clamping device as in claim 6 further comprising
a second locking mechanism, wherein the locking mechanism is configured to secure the pulling element to the clamp bar.

18. A method comprising
placing an object between a first jaw and a second jaw of a clamping device, wherein the second jaw is flexibly coupled to a jaw support so that the second jaw is configured to move toward or away from the jaw support, wherein the first jaw is fixedly coupled to a clamp bar, wherein the jaw support is movably coupled to the clamp bar, wherein the jaw support is configured to be fixed coupled to the clamp bar at discrete positions;

moving the jaw support along the clamp bar;
fixedly coupling the jaw support to the clamp bar;
pulling on a pulling element of the clamp device to secure the object between the first and second jaw, wherein the pulling element is coupled to the second jaw assembly, wherein the coupling between the pulling element and the second jaw assembly comprises a slanting interface, wherein the slanting interface is configured so that when a force is applied to the pulling element in a direction comprising a vertical direction, a second force is generated pushing the second jaw in a direction comprising a direction from the second jaw to the first jaw;

pulling on the pulling element to lift the object.

19. A method as in claim 18 further comprising
moving the jaw support along the clamp bar to accommodate the object.

20. A method as in claim 18
wherein when the pulling element is pulled, the second jaw first moves away from the jaw support to contact the object, and then exerts a force on the object to secure the object between the first and second jaws.

* * * * *